US010972138B2

(12) United States Patent
Sundström et al.

(10) Patent No.: US 10,972,138 B2
(45) Date of Patent: Apr. 6, 2021

(54) TECHNIQUE FOR GENERATING A PROTOCOL DATA UNIT SIGNAL

(71) Applicant: Telefonaktiebolaget LM Ericsson (publ), Stockholm (SE)

(72) Inventors: Lars Sundström, Södra Sandby (SE); Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/470,637

(22) PCT Filed: Dec. 29, 2016

(86) PCT No.: PCT/EP2016/082824
§ 371 (c)(1),
(2) Date: Jun. 18, 2019

(87) PCT Pub. No.: WO2018/121863
PCT Pub. Date: Jul. 5, 2018

(65) Prior Publication Data
US 2020/0091944 A1 Mar. 19, 2020

(51) Int. Cl.
H04B 1/00 (2006.01)
H04B 1/04 (2006.01)
H04B 1/40 (2015.01)
H04L 5/00 (2006.01)
(Continued)

(52) U.S. Cl.
CPC ......... *H04B 1/0078* (2013.01); *H04B 1/0475* (2013.01); *H04B 1/40* (2013.01); *H04L 5/001* (2013.01); *H04L 5/0044* (2013.01); *H04L 27/2614* (2013.01); *H04W 72/0453* (2013.01); *H04B 2001/0408* (2013.01)

(58) Field of Classification Search
CPC .................................................. H04B 1/0078
See application file for complete search history.

(56) References Cited

U.S. PATENT DOCUMENTS

2005/0180524 A1* 8/2005 Hansen ................. H04L 1/0001
375/295
2005/0190724 A1* 9/2005 Hansen ................. H04L 5/0048
370/329
2010/0322219 A1* 12/2010 Fischer ................. H04L 1/0065
370/338

OTHER PUBLICATIONS

Stacey, R., "Specification Framework for TGax", IEEE P802.11 Wireless LANs, Sep. 18, 2015, pp. 1-22, IEEE 802.11-15/0132r8, IEEE.

(Continued)

*Primary Examiner* — Ankur Jain
(74) *Attorney, Agent, or Firm* — Patent Portfolio Builders, PLLC

(57) ABSTRACT

A technique for generating a radio signal (504) for transmitting a protocol data unit (PDU) in a radio network is described. The PDU includes a first portion and a second portion. As to a method aspect of the technique, a first signal indicative of the first portion of the PDU is amplified for radio transmission using a power amplifier (630) in a first operating state. The power amplifier is switched from the first operating state to a second operating state different from the first operating state. A second signal indicative of the second portion of the PDU is amplified for radio transmission using the power amplifier in the second operating state, wherein a first bandwidth of the first signal is greater than a second bandwidth of the second signal.

20 Claims, 13 Drawing Sheets

(51) Int. Cl.
*H04L 27/26* (2006.01)
*H04W 72/04* (2009.01)

(56) References Cited

OTHER PUBLICATIONS

Sun, Y. et al., "Considerations on LRLP Transmissions", Submission, IEEE 802.11-16/xxxxr0, Jan. 16, 2016, pp. 1-10, IEEE.
Godfrey, T. et al., "Integrated Long Range Low Power Operation for IoT", Submission, IEEE 802.11-15/0775r1, Jul. 15, 2015, pp. 1-18, IEEE.
Park, M. et al., "Coexistence Problem", Submission, IEEE 802.11-16/0026r0, Jan. 18, 2016, pp. 1-11, IEEE.
Godfrey, T., "Potential Coexistence Approach", Submission, IEEE 802.11-16/0129r0, Jan. 19, 2016, pp. 1-7, IEEE.

\* cited by examiner

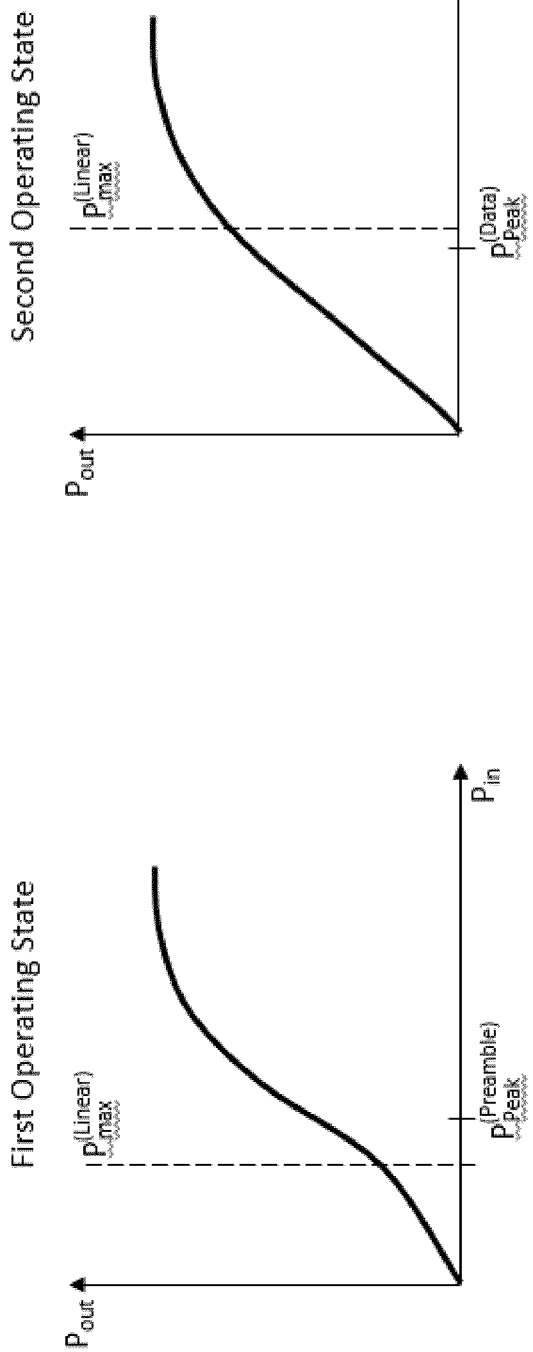
Fig. 13
Fig. 14
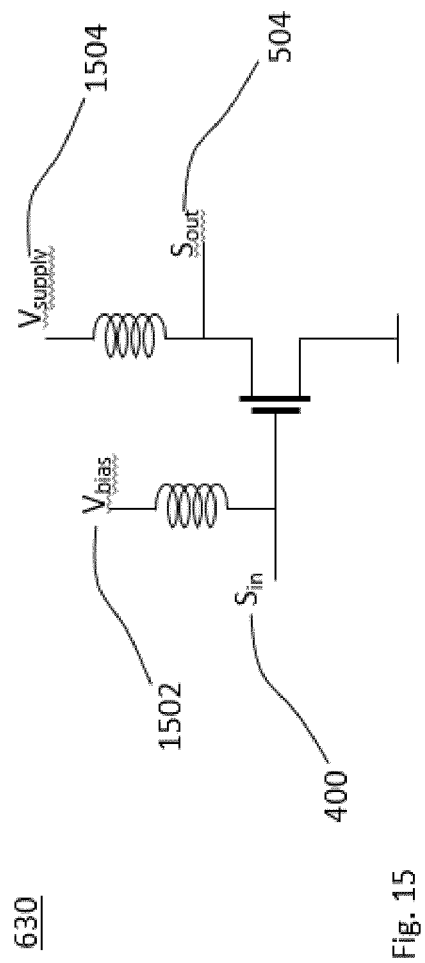
Fig. 15

TECHNIQUE FOR GENERATING A PROTOCOL DATA UNIT SIGNAL

TECHNICAL FIELD

The present disclosure generally relates to a technique for generating a radio signal for transmitting a protocol data unit. More specifically, and without limitation, a method, devices and a station are provided for transmitting the protocol data unit in a radio network using unlicensed spectrum.

BACKGROUND

The number of radio-connected devices significantly increases, e.g., due to the connectivity for the so-called Internet of Things (IoT). A majority of the radio-connected IoT devices operates in unlicensed bands, in particular in the 2.4 GHz ISM band and the 5 GHz band. At the same time, there is an increasing demand for using the same frequency bands, e.g., unlicensed bands, for wideband services such as Wi-Fi according to the standard family IEEE 802.11 or cellular telecommunications that have traditionally been supported in licensed bands. As an example of the latter, the third generation partnership project (3GPP) that traditionally develops specifications for licensed bands has developed versions of Long Term Evolution (LTE) for operation in the 5 GHz unlicensed band, such as LTE License-Assisted Access (LTE-LAA) and LTE in unlicensed spectrum (LTE-U).

Wideband services, e.g. according to an existing or future IEEE 802.11 standard, such as the future standard IEEE 802.11ax, are often not required for individual IoT devices. IoT devices have power restrictions, which can be met by low-power modes using a narrow band of the wideband services. The advantages of narrowband transceivers over wideband (or broadband) transceivers in terms of reduced power consumption are highlighted in document IEEE 802.11-15/0775r1. Low-power IoT devices are often battery-operated and may be required to operate for months or even years without battery replacement or charging, and therefore power-efficiency in the transceiver is of utmost importance. In addition, low-cost transceivers are an essential factor for many IoT applications.

Furthermore, the connectivity requirements of IoT applications largely vary and differ from wideband applications such as file download and video streaming. Specifically, IoT applications typically require a low data rate and the amount of data transmitted in a single packet may often be only a few bytes. In addition, the packet transmissions to and from IoT devices occur very seldom, e.g. once an hour or even less often. Since the number of IoT devices in a radio network may be huge, although the amount of data transferred by each IoT device may be small, the aggregated IoT data traffic may still be substantial. Many use cases for IoT applications can be found in offices, manufacturing industry and residences, and may be related to reading sensors and controlling actuators, etc. The range of coverage for IoT transmissions is therefore substantially less than the usual range, e.g., achievable by a cellular telecommunications system. Since the data rate for individual IoT links is low, a concurrent operation of IoT devices together with wideband stations (e.g., IEEE 802.11ax stations) is an attractive option from the point of view of spectral efficiency.

However, the coexistence of IoT devices with wideband applications requires that the IoT devices are compatible with a mechanism for wideband access to the radio medium. Existing techniques either violate such mechanisms or increase cost and power consumption of IoT devices.

SUMMARY

Accordingly, there is a need for a power-efficient and low-cost technique that allows transmitting protocol data units in a wideband network environment.

As to one aspect, a method of generating a radio signal for transmitting a protocol data unit (PDU) in a radio network is provided. The PDU includes a first portion and a second portion. The method comprises or triggers a step of amplifying a first signal indicative of the first portion of the PDU for radio transmission using a power amplifier in a first operating state; a step of switching the power amplifier from the first operating state to a second operating state different from the first operating state; and a step of amplifying a second signal indicative of the second portion of the PDU for radio transmission using the power amplifier in the second operating state, wherein a first bandwidth of the first signal is greater than a second bandwidth of the second signal.

At least some embodiments can be compatible with the radio network by transmitting the first portion using the first signal having greater bandwidth, e.g., for accessing the radio medium or collision avoidance. Particularly, the first portion may fulfill a mechanism for wideband access to the radio medium of the radio network. Alternatively or in addition, by transmitting the second portion of the PDU using the second signal having less bandwidth than the first signal, the radio transmission of the PDU can be energy-efficient.

Same or further embodiments can be compact and/or cost-efficient by transmitting both the first signal and the second signal using the same power amplifier. The power amplifier may be operated in the first operating state when transmitting the first portion of the PDU. The power amplifier may be operated in the second operating state different from the first operating state when transmitting the second portion of the PDU.

The first and second operating states may define distortion and energy-efficiency of the power amplifier. A deviation of the first operating state from the second operating state may increase the energy-efficiency and the distortion for the amplification of the first signal (e.g., as compared to the amplification of the second signal). The first signal may be more robust to the distortion than the second signal.

The first operating state of the power amplifier may be set to optimize the power efficiency of the power amplifier, e.g., subject to constraints on out-of-band emissions (e.g., a spectrum mask). Alternatively or in addition, the second operating state of the power amplifier may depend on a linearity of the amplification, which is required to fulfill a distortion criterion on the radio signal. The distortion criterion may include a maximum on the distortion of the radio signal, e.g., in terms of an error vector magnitude. The maximum distortion allowed may depend on the modulation and/or coding used to encode the second portion of the PDU.

The technique may be implemented for transmitting the second portion by means of the amplified second signal on a narrowband (NB) channel in the radio network, e.g., for machine-type communication (MTC) and/or NB Internet of Things (IoT) devices. The NB channel may use one resource unit (RU or NB RU) of the radio network.

The technique may be implemented for transmitting the first portion by means of the amplified first signal on a broadband or wideband (WB) channel in the radio network.

The WB channel may use multiple RUs of the radio network or a WB RU that is wider in the frequency domain than the NB RU of the second signal.

The first signal, the first portion and/or the WB channel may be compatible with a WB radio access technology (RAT) of the radio network. The first signal may enable all stations of the radio network, e.g., stations configured exclusively for the WB RAT, to receive and/or decode at least the first portion of the PDU.

The radio network (e.g., the WB channel in the radio network) may be compatible with the WB RAT, e.g., according to the standard family IEEE 802.11 (particularly, IEEE 802.11ax), the 3rd Generation Partnership Project (3GPP) Long Term Evolution (LTE), LTE-Advanced (e.g., 3GPP LTE Release 10, LTE Advanced Pro (e.g., 3GPP LTE Release 13), 3GPP New Radio (NR) for the 5th Generation (5G), any RAT using frequency multiplexing and/or any multi-carrier RAT.

The second signal, the second portion and/or the NB channel may be compatible with a radio protocol for low power radio communication and/or NB radio communication. The radio protocol may build upon the WB RAT, particularly the standard IEEE 802.11ax, e.g., by defining the NB channel as a subchannel of the WB channel. Alternatively or in addition, the radio protocol may implement the standard IEEE 802.15.4 (particularly, ZigBee), Z-Wave, HomeMatic, enOcean, KNX-RF and/or Bluetooth Low Energy.

The radio network may comprise multiple stations. The method may be performed by one or more of the stations of the radio network, which are configured for NB radio communication. Alternatively or in addition, the radio network may comprise a radio access network (RAN). For example, some of the stations of the radio network may function as base stations (also referred to as network nodes or access points) providing radio access, e.g., according to the WB RAT.

The bandwidth may be a baseband bandwidth. Each of the first signal and the second signal may be a baseband signal modulated to encode the first portion and the second portion of the PDU, respectively. The method may further comprise the step of up-converting the amplified first and second signals to the radio signal for the radio transmission.

Alternatively, the bandwidth may be a passband bandwidth. Each of the first signal and the second signal may be an up-converted baseband signal modulated to encode the first portion and the second portion of the PDU, respectively. The method may further comprise the step of up-converting the first and second signals to a radio frequency (or carrier frequency) of the radio signal, e.g., prior to the amplification.

The radio signal may be indicative of the PDU. The radio signal may include the amplified first signal and the amplified second signal. In the time domain, the radio signal may include the amplified first portion of the PDU followed by the amplified second portion of the PDU. The amplified second signal may follow consecutively to the amplified first signal in the radio signal. The first portion and the second portion may be continuous in the time domain, e.g., up to a transition time (or settling time) for switching the power amplifier.

The first portion of the PDU may include at least one of a preamble of the PDU and a header of the PDU.

The radio signal representing the PDU may be structured according to a radio frame, e.g., in the time domain. The structure of the radio frame (also referred to as frame structure) of the radio signal may provide for asynchronous transfer of second portions between the stations of the radio network.

The preamble may include synchronization signals for the radio transmission. The radio network may enable asynchronous or unscheduled transmissions of PDUs. A physical layer of a receiving station may be enabled to synchronize its circuitry to each individual incoming radio signal or frame based on the corresponding preamble. The preamble may enable the receiving station to synchronize to an incoming radio signal indicative of the PDU before the second portion (e.g., data, payload or contents) of the PDU arrives. The preamble and the data may be transmitted in the same frame.

The preamble and/or the header may include at least one of a length field and a rate field. The length field may be indicative of a length or size, e.g., of the PDU and/or the second portion. The length field may include the number of bits, e.g., in octets. The rate field may be indicative of a data rate, e.g., for the PDU and/or the second portion, for example in terms of Mbits/sec. The combination of the length field and the rate field may be indicative of a duration (e.g., a number of microseconds or OFDM symbols) that it takes to transmit the PDU and/or the second portion (e.g., the data, payload or contents). Based on the length field and the rate field, a receiver of the PDU in the radio network is enabled to determine the end of the frame or transmission of the PDU, e.g., for virtual carrier sensing or collision avoidance. By way of example, the receiver may divide the length by the rate, optionally scale the result (e.g., convert octets to bits and Mbps to bps), to obtain the duration (e.g., in seconds).

The radio network may be configured for carrier aggregation. The WB channel may use multiple component carriers, e.g., each component carrier may include 20 MHz of the bandwidth. The first portion and/or the length field may be duplicated over each of the component carriers.

The second portion of the PDU may include at least one of a Service Data Unit (SDU) of the PDU and data of the PDU. The first signal may be encoded with the first portion. The second signal may be encoded with the second portion. The first signal may be modulated to carry the first portion of the PDU as encoded information. The second signal may be modulated to carry the second portion of the PDU as encoded information.

The method may further comprise or trigger generating the first signal and/or generating the second signal. The first signal may be generated by performing a first scheme for coding and/or modulation of the first portion. The second signal may be generated by performing a second scheme for coding and/or modulation of the second portion.

The first scheme may be more robust than the second scheme. E.g., robustness to noise and/or distortion may be greater for the first signal using the first scheme than the second signal using the second scheme. Herein, the first scheme may be more robust than the second scheme, if a loss rate or error rate is lower using the first scheme than the second scheme at the same signal to noise ratio (SNR). Alternatively or in combination, the robustness may be defined by an inverse of an increase of a packet loss rate as a function of power of the noise and/or the distortion. Alternatively or in combination, the robustness may be defined by a rate. The rate of the first scheme may be lower than the rate of the second scheme. The schemes may be modulation and coding schemes (MCSs). The coding may refer to encoding.

The first portion (e.g., the preamble) may be modulated by binary phase shift keying (BPSK) and/or differential BPSK (DBPSK). The second portion (e.g., the data) may be modulated by BPSK, DBPSK, quadrature phase shift keying (QPSK), differential QPSK (DQPSK) and/or quadrature amplitude modulation (QAM). The second portion (e.g., the data) may be encoded using direct sequence spread spectrum (DSSS), complementary code keying (CCK) and/or packet binary convolutional code (PBCC).

A peak-to-average power ratio (PAPR) of the first signal may be lower than a PAPR of the second signal. The first and second operating states may depend on the PAPR of the first and second signals, respectively.

The radio network, e.g., the RAN, may use orthogonal frequency-division multiple (OFDM) access. A first set of orthogonal frequency-division multiplexing (OFDM) subcarriers may be allocated to the first signal. A second set of OFDM subcarriers may be allocated to the second signal. The bandwidth of the first set of OFDM carriers may be greater than the bandwidth of the second set of OFDM carriers. The number of OFDM subcarriers in the first set may be greater than the number of OFDM subcarriers in the second set. The second set may be a proper subset of the first set. The first portion of the PDU may be transmitted on the first set of OFDM subcarriers. The second portion of the PDU may be transmitted on the second set of OFDM subcarriers. The OFDM subcarriers may be equally spaced in the frequency domain (i.e., equal subcarrier spacing).

The number of OFDM subcarriers in the first set may be at least 48 subcarriers, e.g. 52, 106, 242 subcarriers. The first set may correspond to the WB RU. The number of OFDM subcarriers in the second set may be at least 1 subcarrier, e.g., 26 subcarriers. The second set may correspond to the NB RU.

The OFDM subcarriers in at least one of the first set and the second set may be contiguous. The first set of OFDM carriers may be wider in the frequency domain than the second set of OFDM carriers.

The step of amplifying the first signal may include controlling a baseband signal generator to generate a first baseband signal indicative of the first portion and controlling the power amplifier to operate in the first operating state. The step of switching or amplifying the second signal may include controlling a baseband signal generator to generate a second baseband signal indicative of the second portion and controlling the power amplifier to operate in the second operating state.

The method may further comprise or trigger an up-conversion of the first and second baseband signals to the first and second signals, respectively, that are input to the power amplifier. A local oscillator (LO) may provide a time base to the up-conversion according to the radio frequency. The up-conversion may also be referred to as quadrature modulation. The carrier frequency of the LO may be based on the sampling frequency of the clock generator.

The second baseband signal may be translated (or shifted) in the frequency domain relative to the first baseband signal. The second baseband signal may be frequency-translated (or frequency-shifted) according to the second set of OFDM subcarriers within the first set of OFDM subcarriers.

The first and second baseband signals may be up-converted according to the same carrier frequency. The carrier frequency may be a center frequency of the first set of subcarriers.

The first and second baseband signals may be up-converted according to first and second carrier frequencies, respectively. The first carrier frequency may be different from the second carrier frequency. The first carrier frequency may be a center frequency of the first set of the OFDM subcarriers. The second carrier frequency may be a center frequency of the second set of the OFDM subcarriers. The second carrier frequency may be frequency-translated (or frequency-shifted) relative to the first carrier frequency according to the second set of OFDM subcarriers within the first set of OFDM subcarriers.

Generating the first and second baseband signals may include at least one of an inverse Fourier transformation (e.g., iFFT) and a digital-to-analog conversion (DAC) according to first and second sampling frequencies defining the first and second bandwidths, respectively. A clock generator may provide a time basis or clock signal to the digital-to-analog converter (DAC) according to the respective sampling frequency.

A length of the OFDM symbols in the first portion (e.g., for the preamble) and the second portion (e.g., for the data) may be different. For example, the preamble may use FFT64 and a symbol duration of 3.2 μs (e.g., plus 0.8 μs for a cyclic prefix). The data may use FFT256 and a symbol duration of 12.8 μs (e.g., plus a cyclic prefix, which can be configured to be 0.8 μs, 1.6 μs or 3.2 μs).

The first sampling frequency may be derived from the second sampling frequency that is lower than the first sampling frequency. The first sampling frequency may be derived from the second sampling frequency by means of a delay locked loop.

Switching the power amplifier from the first operating state to the second operating state may include changing, e.g., increasing, at least one of a bias voltage, a bias current, a supply voltage and a supply current of the power amplifier.

The amplification of the power amplifier in the second operating state may be more linear than the amplification of the power amplifier in the first operating state. For example, a second linear (dynamic) range of the power amplifier in the second operating state may be greater than a first linear (dynamic) range of the power amplifier in the first operating state. Alternatively or in addition, the amplification of the power amplifier in the first operating state may be more energy-efficient than the amplification of the power amplifier in the second operating state.

The PDU may include a physical layer PDU. The PDU may be a Physical Layer Convergence Protocol (PLCP) PDU or PPDU, e.g., according to the IEEE 802.11 standard family. The PLCP may append the preamble and/or the header to the SDU (e.g., a PSDU of the PLCP, or a MAC PDU or MPDU of a Medium Access Control layer).

The PDU may include a wake-up signal (WUS). E.g., the first portion may include a legacy preamble and the second portion may include the WUS.

In an advanced implementation, the method may further comprise or trigger performing a carrier sense multiple access (CSMA) or a clear channel assessment, (CCA) for the first bandwidth before transmitting the PDU. The PDU, i.e., the radio signal, may be transmitted, if the CSMA or CCA is indicative of a clear channel. The CSMA and/or the CCA may be performed on the first set of OFDM subcarriers.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the radio network and/or the Internet.

As to another aspect, a device for generating a radio signal for transmitting a PDU in a radio network is provided. The PDU includes a first portion and a second portion. The device may be configured to trigger or perform the method aspect. Alternatively or in addition, the device comprises an amplifying unit configured to amplify a first signal indicative of the first portion of the PDU for radio transmission using a power amplifier in a first operating state; a switching unit configured to switch the power amplifier from the first operating state to a second operating state different from the first operating state; and the amplifying unit further configured to amplify a second signal indicative of the second portion of the PDU for radio transmission using the power amplifier in the second operating state, wherein a first bandwidth of the first signal is greater than a second bandwidth of the second signal.

As to another aspect, a device for generating a radio signal for transmitting a PDU in a radio network is provided. The PDU includes a first portion and a second portion. The device comprises a processor and a memory, said memory containing instructions executable by said processor whereby the device is operative to amplify a first signal indicative of the first portion of the PDU for radio transmission using a power amplifier in a first operating state; switch the power amplifier from the first operating state to a second operating state different from the first operating state; and amplify a second signal indicative of the second portion of the PDU for radio transmission using the power amplifier in the second operating state, wherein a first bandwidth of the first signal is greater than a second bandwidth of the second signal.

According to a still further aspect, a transmitter structure configured for transmitting a PDU in a radio network is provided. The transmitter structure is configured to perform the method aspect or comprises a device for generating a radio signal for transmitting the PDU in the radio network according to any of the device aspects.

As to as still further aspect, a station configured for transmitting a PDU in a radio network is provided. The PDU includes a first portion and a second portion. The station may comprise the device according to the device aspect or may be configured to perform the method aspect. Alternatively or in addition, the station comprises a first portion module for amplifying a first signal indicative of the first portion of the PDU for radio transmission using a power amplifier in a first operating state; a switching module for switching the power amplifier from the first operating state to a second operating state different from the first operating state; and a second portion module for amplifying a second signal indicative of the second portion of the PDU for radio transmission using the power amplifier in the second operating state, wherein a first bandwidth of the first signal is greater than a second bandwidth of the second signal.

The devices and/or the station may further include any feature disclosed in the context of the method aspect. Particularly, any one of the units and modules, or a dedicated unit or module, may be configured to perform one or more of the steps of any one of the method aspect.

BRIEF DESCRIPTION OF THE DRAWINGS

Further details of embodiments of the technique are described with reference to the enclosed drawings, wherein:

FIG. 13 schematically illustrates an amplification of a power amplifier in a first operating state;

FIG. 14 schematically illustrates an amplification of a power amplifier in a second operating state;

FIG. 15 shows a schematic block diagram of a power amplifier for controlling operating states of the power amplifier.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Wireless Local Area Network (WLAN) according to the standard family IEEE 802.11 (e.g., IEEE 802.11a, g, n, ac or ax), it is readily apparent that the technique described herein may also be implemented in any other radio network, including implementations of Long Term Evolution (LTE), LTE-Advanced, LTE-Advanced Pro or a successor thereof and 3GPP New Radio for a 5th Generation (5G) of radio networks.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions and steps or implement the units and modules disclosed herein.

Figure 1:
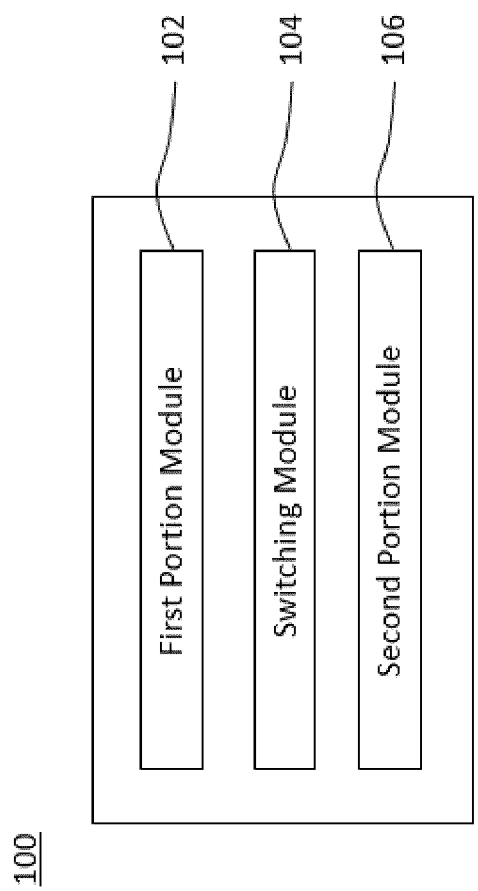
FIG. 1 shows a schematic block diagram of a device for transmitting a protocol data unit (PDU) in a radio network.

FIG. 1 schematically illustrates a block diagram of a device 100 for generating a radio signal for transmitting a protocol data unit (PDU) in a radio network. The PDU includes a first portion and a second portion. The device 100 comprises a first portion module 102 that amplifies, or controls the amplification of, a first signal indicative of the first portion of the PDU for radio transmission using a power amplifier in a first operating state. The device 100 further comprises a switching module 104 that switches the power amplifier from the first operating state to a second operating state different from the first operating state. A second portion module 106 of the device 100 amplifies, or controls the amplification of, a second signal indicative of the second portion of the PDU for radio transmission using the same power amplifier in the second operating state.

A second bandwidth of the second signal is less than a first bandwidth of the first signal. The first and second operating states may optimize a power consumption of the power amplifier for the first and second signals, respectively, e.g., depending on the first and second bandwidths, respectively. For example, the operating states define a distortion (e.g., a frequency-dependent gain factor) and/or a non-linearity (e.g., in an output amplitude as a function of an input amplitude) of the power amplifier depending on a robustness of the first and second signals, respectively, against the distortion and/or the non-linearity.

At least one of the modules 102 to 106 may be implemented in a controlling unit of the device 100 or as part of the power amplifier. The device 100 may be embodied by a chip or chipset. The device 100 may be deployed in a station of the radio network (e.g., a wireless device) and/or for machine-type communication.

Figure 2:
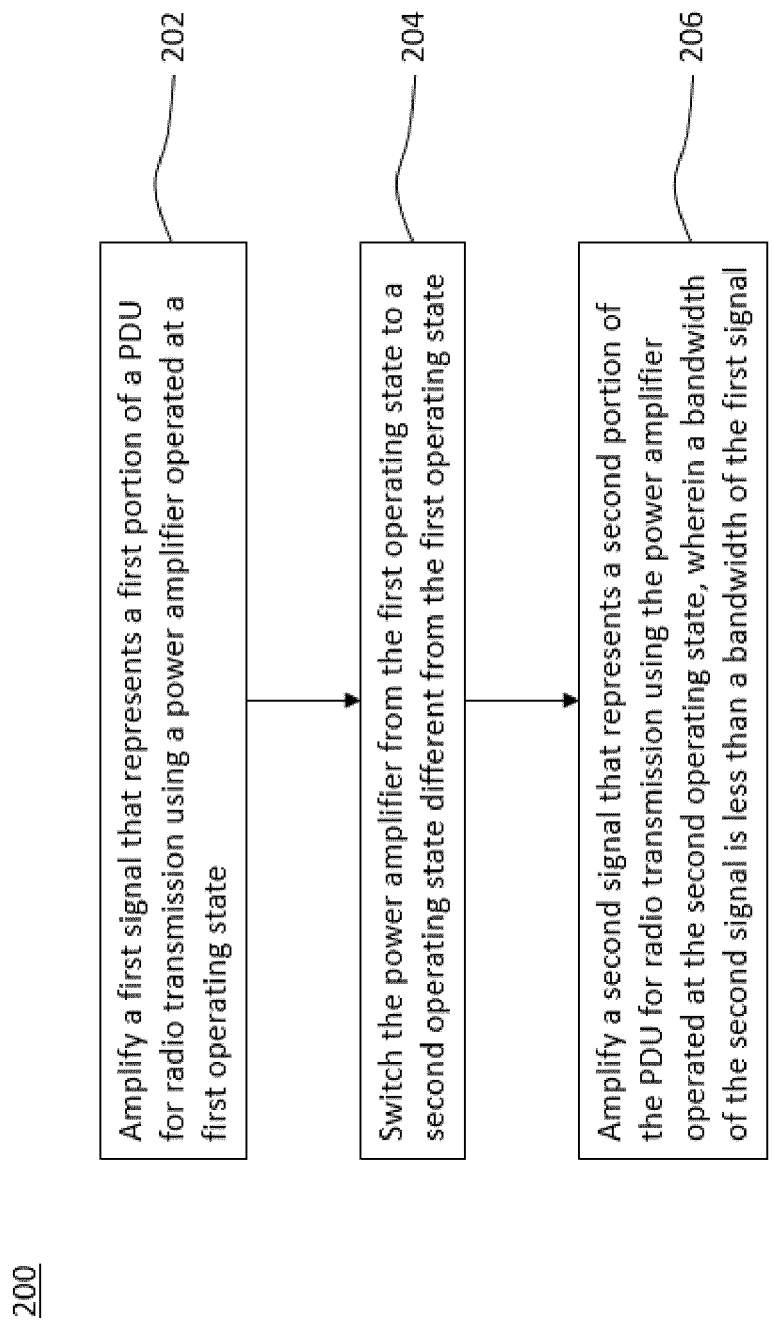
FIG. 2 shows a flowchart for a method of transmitting a PDU in a radio network, which is implementable by the device of FIG. 1.

FIG. 2 shows a method 200 of generating a radio signal for transmitting a PDU in a radio network. The PDU includes a first portion and a second portion. In a step 202 of the method 200, a first signal indicative of the first portion of the PDU is amplified for radio transmission using a power amplifier driven in a first operating state. The power amplifier is switched from the first operating state to a second operating state different from the first operating state in a step 204. Using the second operating state, the power amplifier amplifies a second signal indicative of the second portion of the PDU for radio transmission. A first bandwidth of the first signal is greater than a second bandwidth of the second signal.

The method 200 may be performed by the device 100, e.g., by a chip or chipset, and/or at a station of the radio network. For example, the modules 102, 104, 106 may perform the steps 202, 204 and 206, respectively. The technique enables generating a wideband (WB) waveform in a narrowband (NB) station, particularly an IoT device, in coexistence with WB stations (e.g., Wi-Fi stations implementing a standard of the standard family IEEE 802.11).

By using the same power amplifier in different operating states for generating the radio signal indicative of the PDU, the device 100 is implementable in a low-cost, power-efficient transmitter architecture for NB low-energy IoT stations. In particular, the device 100 can be implemented to generate wideband waveforms according to the first signal by enhancing in the first operating state the power amplifier (and optionally further components of a radio) designed primarily for NB transmission (and/or reception) in the second operating state.

A transmitter (e.g., a transceiver), which is operated according to the method 200 for generating a radio signal including the WB first signal and the NB second signal, can fulfill an access mechanism (also: protection mechanism) for shared WB radio resources (e.g., bandwidth protection and/or carrier sensing) by virtue of the first signal with less manufacturing costs and/or reduced board footprint due to the second signal being amplified by the same power amplifier. Herein, the terms WB and broadband may be interchangeable.

In contrast, a conventional transceiver is either unable to transmit the first portion on a WB channel or requires a dedicated power amplifier, which adds to the manufacturing costs and/or the board footprint.

By changing the operating state of the power amplifier for the first and second signals, the power consumption can be minimized, e.g. constrained individually for the first signal and the second signal by quality requirements, robustness to channel noise and/or targets for a block error rate. By way of example, a first block error rate may be defined (e.g., as a target) for transmitting the first portion of the PDU and/or a second block error rate may be defined (e.g., as a target) for transmitting the second portion of the PDU. Alternatively or in addition, the same target may be defined for the block error rate of both the first signal and the second signal, resulting in different quality requirements for the amplification (e.g., in terms of distortion and/or non-linearity) of the first and second signals due to different robustness to noise for the first and second signals, respectively. Furthermore, the power consumption can be reduced due to the second bandwidth of the second signal being reduced compared to the first bandwidth of the first signal.

In contrast, a conventional transceiver requires a power-inefficient power amplifier configured for linear amplification of both the first signal and the second signal. For reducing the power consumption of such conventional transceivers, degradations to bandwidth protection and/or violations of access mechanisms have to be accepted.

The station may transmit the PDU to a base station or a network controller of the radio network. The station may be a user equipment (UE) or mobile station. In a 3GPP LTE implementation of the radio network, the base station may be an evolved Node B (eNB). In a Wi-Fi implementation, the base station may be an access point. The radio network may include a basic service set (BSS).

Figures 3, 4:
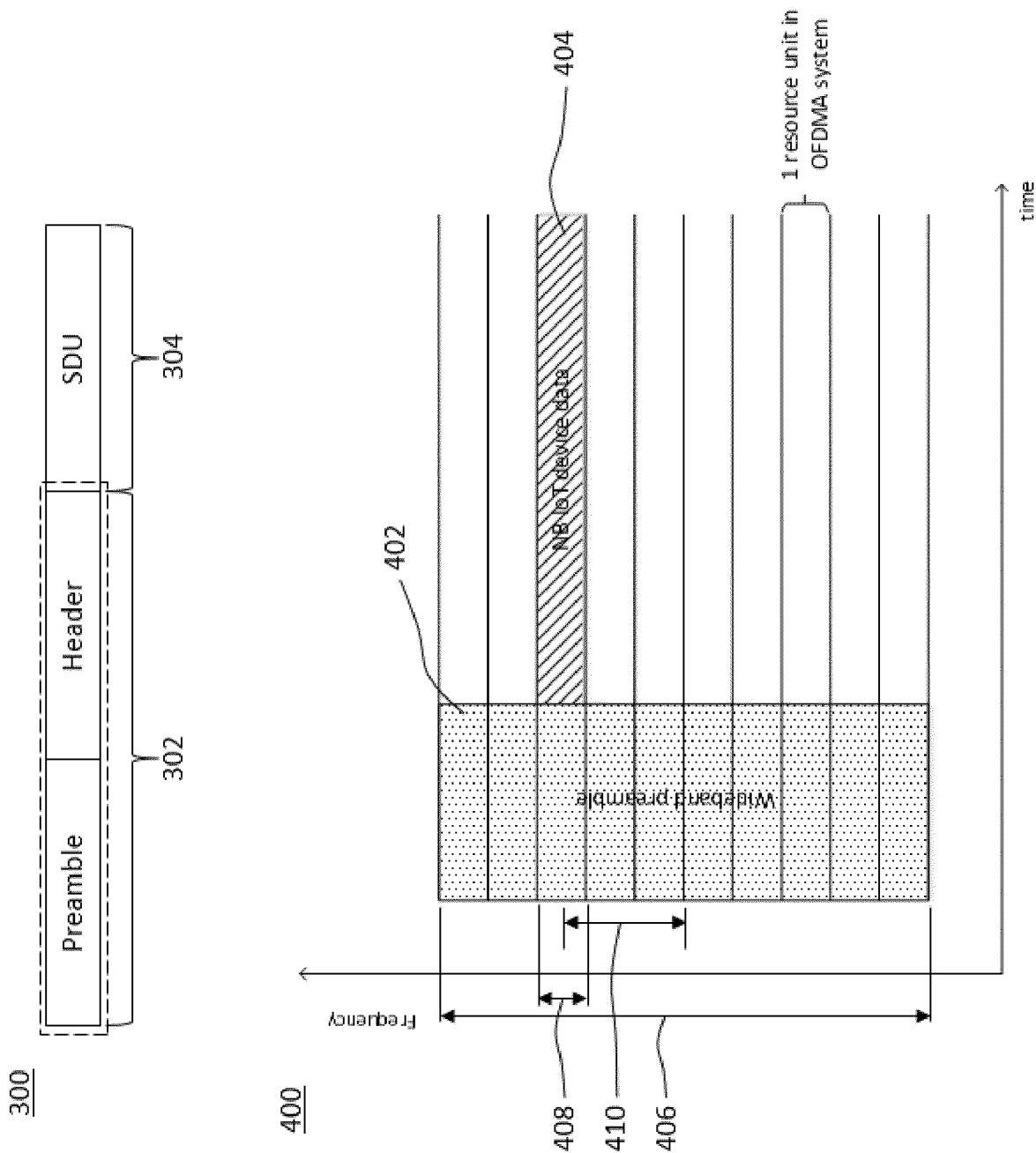
FIG. 3 schematically illustrates an example for a logical structure of a PDU, which is implementable in the device of FIG. 1 or usable in the method of FIG. 2.
FIG. 4 schematically illustrates an example for a time-frequency structure of a PDU signal, which is generated by the device of FIG. 1 according to the method of FIG. 2.

FIG. 3 shows an example structure for the PDU 300 comprising a first portion 302 and a second portion 304. The first portion 302 includes information needed for the protection mechanism, which may also be referred to as carrier sensing (CS).

In a first variant, the first portion includes a header. The header includes one or more fields according to a physical layer protocol of the radio network, e.g., according to the protection mechanism for accessing the radio medium of the radio network. The PDU may be transmitted by the station in fulfillment of the protection mechanism, a media occupancy limit and/or a duty cycle limit defined in the radio network. For example, the header may contain the length and rate fields.

The header may further include at least one of a cyclic redundancy check (CRC) field and signaling fields. The CRC field is indicative of a CRC value for the PDU 300 or the second portion 304. The signaling field is indicative of a data rate or a modulation and coding scheme for the second portion.

Optionally, e.g., for asynchronous transmissions of PDUs 300, the first portion 302 includes a preamble that provides synchronization signals. For example, in a Wi-Fi implementation, the preamble includes training fields, e.g., for coarse synchronization, fine synchronization and initial channel estimate. In the time domain, the preamble is ahead of the header. The preamble and the header may be separated by a Start-of-Frame Delimiter (SFD).

In a second variant, e.g. according to IEEE 802.11ax, the preamble may be defined as an entity including the header or the entirety of the first portion 302, which is indicated by dashed lines in FIG. 3. The preamble may include the header, as defined for the first variant. For example, the preamble includes one or more training fields and one or more signaling fields. The header may be contained in the signaling fields. The length field is an element in the header. More specifically, an 802.11ax PDU 300 may start with a legacy 802.11 preamble and header, wherein the legacy header may contain the length and rate fields.

Moreover, in other radio technologies (e.g., Bluetooth), the preamble may be defined differently. For example, the preamble does not contain a header.

In any variant, the PDU 300, the header and/or the preamble may be referred to as a PHY PDU, PHY header and PHY preamble, respectively, to clarify that the PDU is generated and/or processed by the physical layer (PHY) of the protocol stack.

For example, in a Wi-Fi implementation, the PDU is a physical layer convergence protocol (PLCP) PDU or PPDU. The preamble (e.g., the header within the preamble) or a separate header includes a length field and a rate field. Other stations in the radio network read the length field and defer the radio medium for an amount of time specified by the length field, e.g., even if the other station cannot demodulate the second portion 304 of the PDU. This deferral (which may also be referred to as Clear Channel Assessment based on Carrier Sensing or CCA-CS) is an example of a protection mechanism or CCA based on signal-detection, as opposed to a protection mechanism or CCA that is based on energy-detection (CCA-ED).

The second portion 304 of the PDU may include a service data unit (SDU) or any payload, e.g., the transmit data of a next-higher layer of a protocol stack at the station or the device 100. For example, the second portion 304 includes a Medium Access Control (MAC) PDU or MPDU.

For concreteness and not limitation, the first portion 302 may be referred to as the "preamble", and the second portion 304 may be referred to as the "data".

The radio network may use orthogonal-frequency division multiple access (OFDMA), e.g., according to the standard IEEE 802.11ax. While radio networks implementing Wi-Fi, and in particular IEEE 802.11ax, are described for the sake of concreteness, the technique can be applied in any stand-alone and cellular radio networks, e.g., implementing 3GPP LTE and/or operating in unlicensed bands.

The document "Specification Framework for TGax" (IEEE 802.11-15/0132r8 of September 2015) is an IEEE P802.11 Wireless LANs proposal for IEEE 802.11ax, wherein OFDMA is used to allow simultaneous transmission to and from several stations. The nominal channel bandwidth is 20 MHz, and the subcarrier spacing is 20/256 MHz=78.125 kHz. Depending on how much information should be transmitted to a given station, the station is allocated more or less of the total available bandwidth. The smallest resource unit (RU or NB RU) includes 26 subcarriers, which corresponds to a bandwidth of about 2 MHz (more specifically, 26·78.125 kHz=2.031 MHz). Furthermore, a station of the radio network may be allocated the NB RU including 26 subcarriers or a WB RU include more than 26 subcarriers, e.g., 52 subcarriers, 106 subcarriers, or the full bandwidth which corresponds to 242 subcarriers.

FIG. 4 schematically illustrates an example time-frequency structure of the signal 400 that is input to the power amplifier. The signal 400 is indicative of the PDU 300.

More specifically, the signal 400 comprises the first signal 402 indicative of the first portion 302 and the second signal 404 indicative of the second portion 304 of the PDU 300. A first bandwidth 406 of the first signal 402 corresponds to a first set of subcarriers for a WB transmission. A second bandwidth 408 of the second signal 402 corresponds to a second set of subcarriers for a NB transmission. The second bandwidth 408 is smaller than the first bandwidth 406. E.g., the first bandwidth 406 is at least 3 or 4 times greater than the second bandwidth 408.

The second set of subcarriers may be a proper (i.e., strict) subset of the first set. Alternatively, e.g. in the case of IEEE 802.11ax, the numerologies and/or frequency allocation structure may change from the WB first signal 402 to the NB second signal 404. For example, the subcarrier spacing may change from the WB first signal 402 to the NB second signal 404. Regardless of a detailed frequency allocation structure, the first signal 402 (e.g., carrying the preamble) occupies the first bandwidth 406 that is greater than the second bandwidth 408 of the second signal 404 (e.g., carrying the data).

Moreover, the center frequency of the second set is shifted by a frequency offset $\Delta f$ (shown at reference sign 410) relative to the center frequency of the first set.

By amplifying the signal 400 according to the method 200, the radio signal output by the power amplifier enables a NB transmission of the second portion 304 with a WB transmission of the first portion 302 (which may be referred to as "WB preamble" for brevity).

A station transmitting the radio signal generated according to the device 100 may be referred to as a NB station. The NB station may be a low-energy station or an IoT station. While the NB station does not require the bandwidth of a WB RU for its data transmissions (i.e., the second portion 304), the WB preamble (i.e., the first portion 302) is indicative of the information needed for the protection mechanism in the radio network. Hence, the technique enables the coexistence of WB stations and NB stations in OFDMA radio networks (such as IEEE 802.11ax) by implementing the device 100 in the NB station.

In contrast, conventional NB stations are unable to detect signals transmitted from WB stations, and WB stations are unable to detect signals from conventional NB stations. The WB stations may also be referred to as legacy WB stations, as their protocol stack is not configured to detect NB signals of conventional NB stations. Hence, in a radio network comprising WB stations and conventional NB stations, only energy-detection (ED) can be employed for CCA. However, energy-detection (i.e., CCA-ED) is not as effective as signal-detection (i.e., CCA-CS), since ED does not acquire the information needed for carrier sensing (e.g., the length and rate fields) in the first portion 302, and a signal threshold for ED is greater than a signal threshold for signal-detection (CS). In a Wi-Fi implementation, the threshold for ED may be 20 dB above the minimum receiver sensitivity of the physical layer (e.g., 20 dB above the minimum modulation and coding rate sensitivity). More specifically, the sensitivity depends on the modulation and coding scheme. The energy and signal detection thresholds do not depend on the modulation and coding scheme. In a Wi-Fi implementation, the energy detection threshold may be 20 dB above the signal detection threshold. Typical values are −62 dBm and −82 dBm, respectively. Only if the in-band signal energy crosses the threshold for ED, CCA-ED is held busy until the medium energy falls below the threshold.

Figure 5:
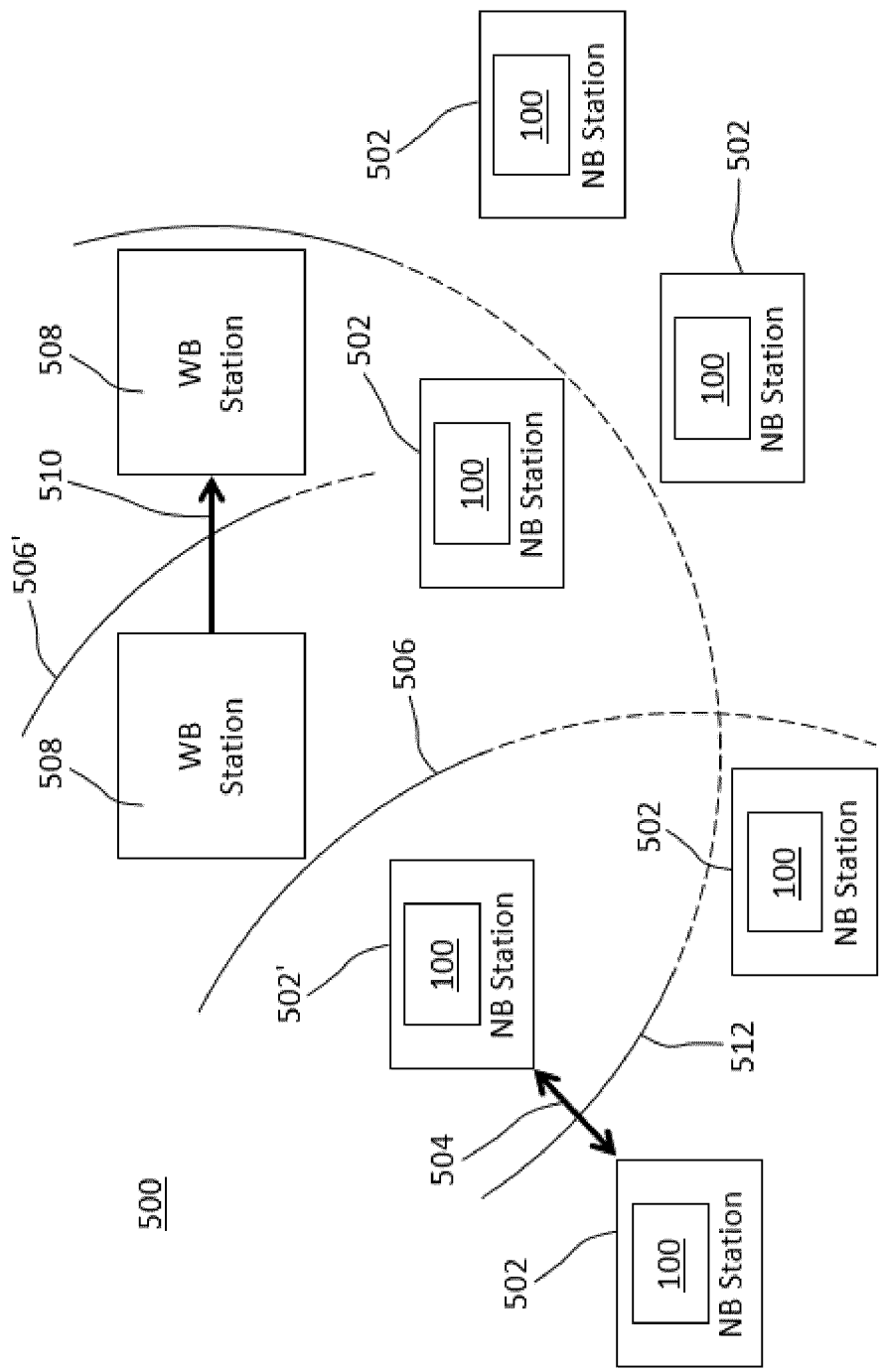
FIG. 5 schematically illustrates an example for a radio network including at least one embodiment of the device of FIG. 1.

FIG. 5 schematically illustrates an example radio network 500 comprising at least one station 502 including an embodiment of the device 100. Since the station 502 does not use a WB RU for transmitting the data 304, the station 502 is referred to as a NB station 502. The radio signal 504 generated according to the method 200 is transmitted from the at least one NB station 502 to another station of the radio network 500, e.g., a WB station 508 or another NB station 502 including another embodiment of the device 100, the latter case being illustrate in FIG. 5.

FIG. 5 further illustrates example radii 506 and 512 for receiving the radio signal 504 transmitted by a NB station 502 and for receiving a radio signal 510 from a WB station 508, respectively. The radio network 500 employs distributed channel access based on the CCA, e.g. according to IEEE 802.11. That is, the WB station 508 (and optionally each of the stations 502 and 508) performs CCA-CS in order to detect transmissions from other stations and thus prevents collisions.

The NB stations 502 may be implemented without CCA-CS. For example, only the WB stations 508 perform CCA-CS. Each of the NB stations 502 may be scheduled by one of the WB stations 508.

The first portion 302 (e.g., the length field and/or the rate field) enables CCA-CS at the WB stations 508. Alternatively or in addition, the first signal 402 enables decoding the second signal 404 for higher-layer information (e.g., for virtual carrier sensing). A conventional IoT station that does not transmit the preamble 302 on a WB channel according to the first signal 402 (i.e., the "WB preamble") significantly increases the collision rate in the radio network 500, since the radius for CCA-ED is significantly smaller than the radius 506 for CCA-CS. By transmitting the first portion 302 according to the WB first signal 402 indicative of the information for the CCA-CS (e.g., the length field), the technique enables CCA-CS within the radius 506 of the transmitting NB station 502.

Furthermore, conventional IoT stations that do not transmit the WB preamble cause or exacerbate a hidden-node problem in the radio network, if the physical carrier sensing at another transmitting station in the radio network fails to detect the NB transmissions from these conventional IoT stations, whose signals cause interference at the intended receiver of the other transmitting station. The physical carrier sensing may fail, because the signal energy is too low for CCA-ED and/or because the conventional IoT station does not provide the CCA-CS information (e.g., the length and rate fields) on the WB channel.

The technique can alleviate the hidden-node problem, in a radio network 500 using virtual carrier sensing (as another example for the protection mechanism), which may be used in conjunction with physical carrier sensing (e.g., CCA-CS). For example, in a radio network 500 implementing a IEEE 802.11 standard, when a WB station 508 detects the PDU 300 transmitted by means of the radio signal 504 from the NB station 502' according to the method 200, the WB station 508 synchronizes its receiver based on the synchronization signals (e.g., in the training fields) in the first signal 402 of the preamble 302, which enables the WB station 508 to read a duration field included in the second portion 304. The duration field may be located in a MAC header of the MPDU in the second portion 304. The duration field specifies the transmission time required for the frame or radio signal 504 of the PDU 300, in which time the medium will be busy. Based on the duration field, the WB station 508 sets a network allocation vector (NAV), which is an indicator for the WB station 508 on how long it defers from accessing the medium.

By way of example, the NB station 502' within both the radius 506 of the NB station 502 and the radius 512 of the WB station 508 in FIG. 5 transmits the PDU 300 by generating the radio signal 504 according to the method 200. The legacy WB station 508 is able to decode the preamble 302 of the PDU 300, as it is within the radius 506' of the NB station 502', and defer its transmission 510, so that a response to the PDU 300 (e.g., from the NB station 502) is received within the radius 506 by the NB station 502'.

Figure 6:
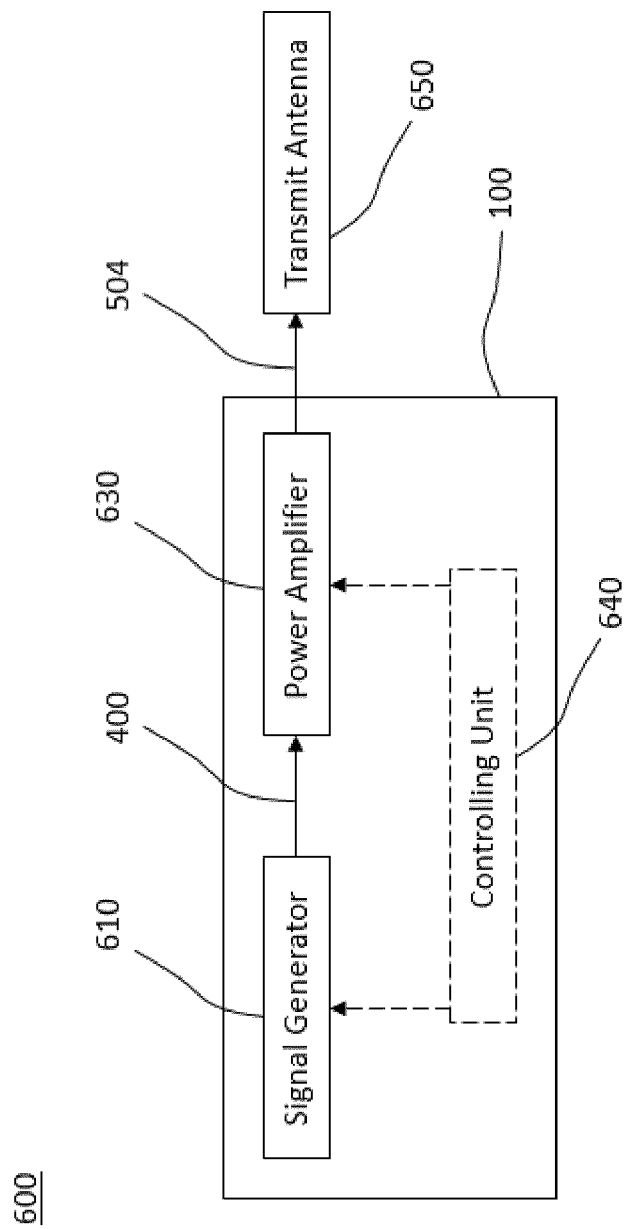
FIG. 6 shows a schematic block diagram for a first embodiment of the device of FIG. 1.

FIG. 6 shows a schematic block diagram for a transmitter architecture 600 comprising a first embodiment of the device 100. The transmitter architecture 600 is controlled or operated according to a first implementation of the method 200. A signal generator 610 selectively provides the first signal and the second signal, which are input 400 to the power amplifier 630. The power amplifier 630 operated according to the method 200 outputs the radio signal 504 to one or more transmit antennas 650.

The modules 102 to 106 may be implemented, e.g., partly or completely, by the signal generator 610 and/or the power amplifier 630. For example, the signal generator 610 may trigger the first operating state of the power amplifier 630 when providing the first signal 402 in the step 202, and the signal generator 610 may trigger the second operating state of the power amplifier 630 according to the step 204 when providing the second signal 404 in the step 206.

Alternatively or in addition, the transmitter architecture 600 may include a controlling unit 640 that performs or controls at least one of the steps 202 to 206. The controlling unit 640 may be coupled to both the signal generator 610 and the power amplifier 630. For example, the controlling unit 640 may synchronously trigger generating and amplifying the first signal in the step 202, and/or may synchronously trigger generating and amplifying the second signal in the step 206. The controlling unit 640 may perform or control all steps of the method 200, thus implementing the device 100.

Figure 7:
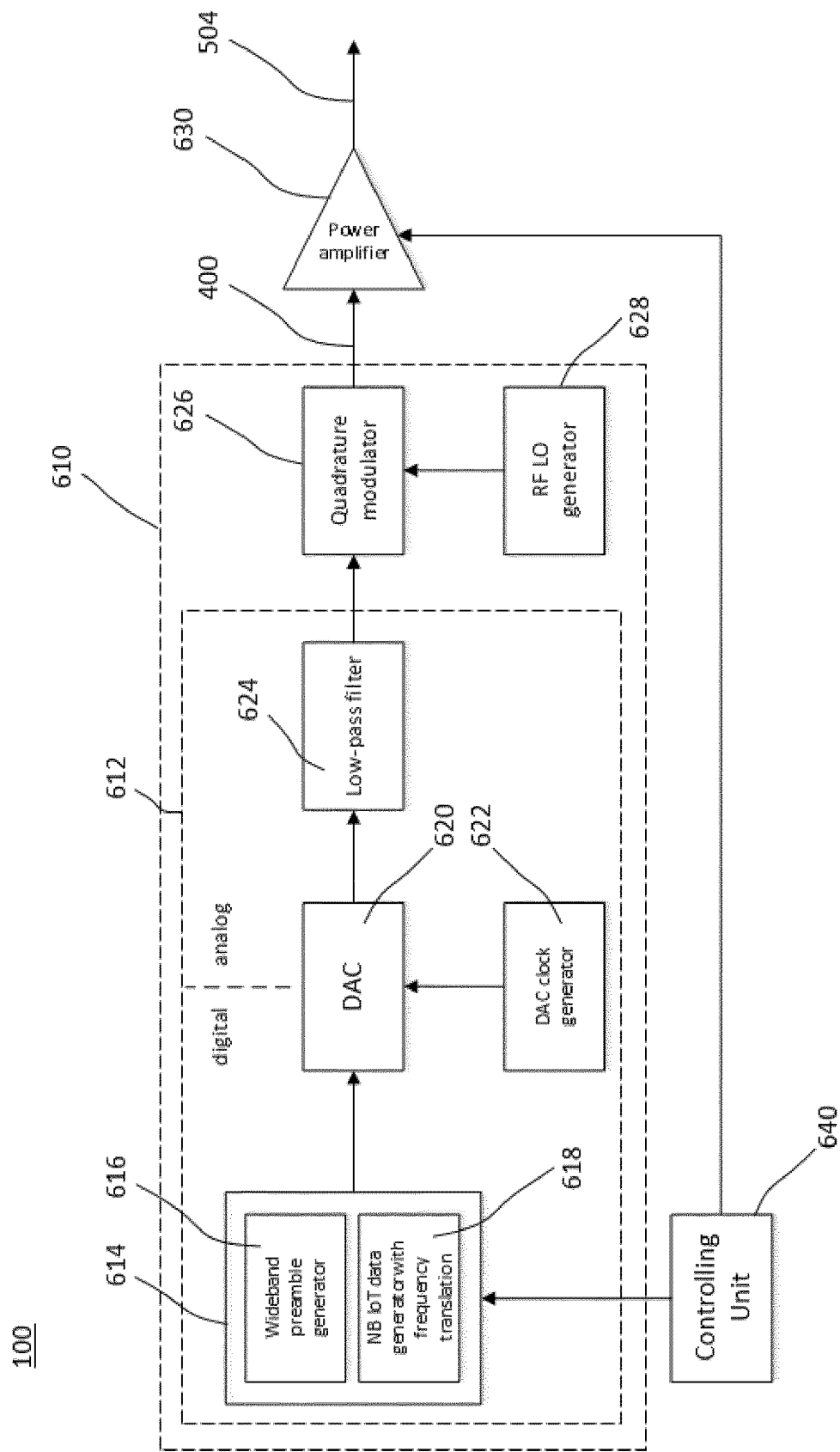
FIG. 7 shows a schematic block diagram for a second embodiment of the device of FIG. 1.

FIG. 7 shows a schematic block diagram for a second embodiment of the device 100. Features equivalent or interchangeable with the first embodiment are indicated by like reference signs. The device 100, or the transmitter architecture 600 controlled by the device 100, comprises the signal generator 610, the power amplifier 630 and optionally the controlling unit 640.

The signal generator 610 comprises an analog baseband signal generator 612. Here, the terminology "analog baseband signal generator" refers to the unit 612 for generating the analog baseband signal. Nonetheless, the analog baseband signal generator 612 may contain both a digital domain and an analog domain. For example, the analog baseband signal generator 612 comprises a digital baseband signal generator 614, a digital-to-analog converter (DAC) 620 and baseband reconstruction filters 624. Preferably, the transmitter architecture 600 uses the same signal path in the analog baseband signal generator 612 for generating and processing first and second baseband signals indicative of the preamble 302 and the data 304, respectively.

The digital baseband signal generator 614 outputs IQ data to the DAC 620. The DAC 620 may include a DAC unit for each of the I-component and the Q-component of the digital baseband signal. The DAC 620 is clocked by a baseband clock generator 622 (which may also be referred to as a DAC clock generator).

The analog baseband signal is processed by the baseband reconstruction filters 624, e.g., including a filter or filter set for each of the I-signal and the Q-signal. The resulting baseband signal is up-converted to a radio frequency (RF or carrier frequency) by a quadrature modulator 626. The time-frequency structure of the signal schematically illustrated in FIG. 4 may represent the baseband signal (with the DC component at the center frequency of the first baseband signal indicative of the preamble 302) or the resulting radio frequency signal 400 (with the RF at the center frequency of the first signal 402).

While the DAC receives a baseband clock signal from the DAC clock generator 622, the quadrature modulator 626 receives a quadrature local oscillator (LO) signal from an RF LO 628, e.g., a phased-locked loop (PLL).

The controlling unit 640 controls when to transmit the WB preamble, i.e., the first signal 402, and the NB IoT data, i.e., the second signal 404. The controlling unit 640 also controls an operating point of the power amplifier 630 according to the step 204 such that the power amplifier 630 operates in a more power-efficient but less linear mode (i.e., the first operating state) during WB preamble transmission in the step 202 and a less power-efficient and more linear mode (i.e., the second operating state) during NB IoT transmission in the step 206.

The digital baseband signal generator 614 comprises a WB preamble generator 616 that generates a first digital baseband signal indicative of the WB preamble 302 and a NB IoT data generator 618 that generates a second digital baseband signal indicative of the NB IoT data 304. Both the first digital baseband signal indicative of the WB preamble 302 and the second digital baseband signal indicative of the NB IoT data 304 are fed to the same DAC 620 capable of handling the larger second bandwidth 406 of the WB preamble signal 402.

Generating the second digital baseband signal indicative of the NB IoT data 304 includes a frequency translation (e.g., by multiplying a DC-centered baseband signal with $e^{j2\pi \Delta ft}$, wherein $\Delta f$ is the translation frequency 410) to the desired NB RU location (e.g., the second set of subcarriers) in the frequency domain. The LO signal of the RF LO generator 628 is centered with respect to the center frequency of the WB preamble signal 402 (e.g., the carrier frequency).

Figure 8:
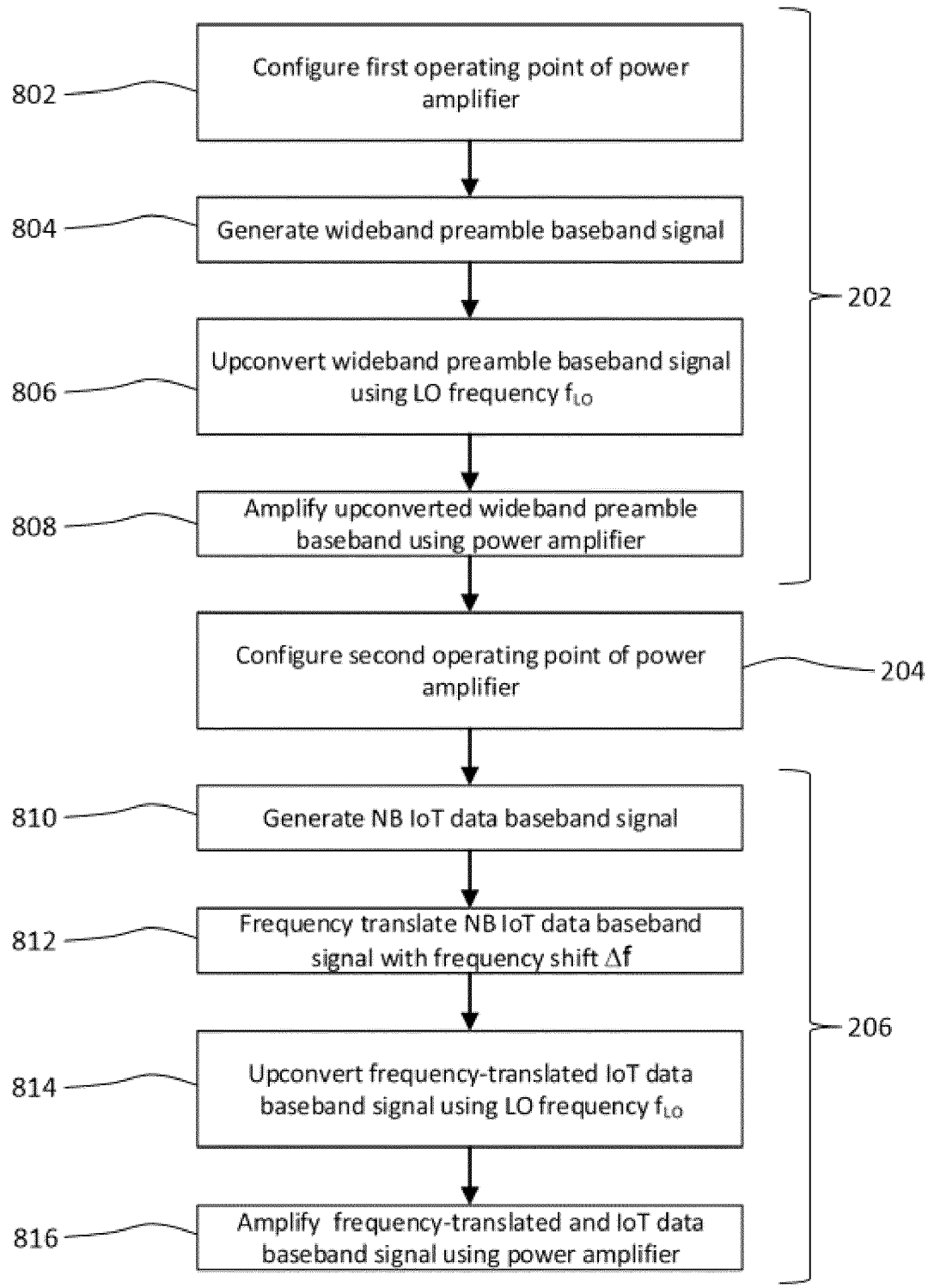
FIG. 8 shows a flowchart for a second implementation of the method of FIG. 2, which can be performed by the device of FIG. 7.

A flow chart for operating the second embodiment according to a second implementation of the method 200 is shown in FIG. 8. In a substep 802 of the step 202, the power amplifier 630 is set to the first operating point. The generator 612 is controlled to generate the first baseband signal indicative of the preamble 302 in a substep 804. The first baseband signal is up-converted by the modulator 626 to the first signal 402 in a substep 806 using the LO signal. In a substep 808, the first signal 402 is amplified by the power amplifier 630 in the first operating state.

In the step 204, the power amplifier 630 is set to the second operating point for the second operating state.

In a substep 810 of the step 206, the NB IoT data generator 618 generates the second digital baseband signal indicative of the NB IoT data 304. The second digital baseband signal is frequency-translated by the frequency offset 410. The frequency translation may be performed, e.g., by the NB IoT data generator 618, in the frequency domain (e.g., by reallocating OFDM symbols) or after inverse Fourier transformation in the time domain (e.g., by multiplying the time-dependent phase factor $e^{j2\pi \Delta ft}$). Alternatively or in combination, the frequency translation may be performed in the analog domain.

The frequency-translated second baseband signal is up-converted by the modulator 626 to the second signal 404 in a substep 814 using the same LO signal. In a substep 816, the second signal 404 is amplified by the power amplifier 630 in the second operating state.

The output of the power amplifier 630 is coupled to the transmit antenna 650, so that the radio signal 504 is transmitted as the first signal 402 and the second signal 404 are amplified. The transmissions of the amplified first signal 402 and the amplified first signal 404 is also referred to as WB transmission and NB transmission, respectively.

The second embodiment of the device 100 can switch between NB transmission and WB transmission very fast. Furthermore, the second embodiment is compact and cost-efficient, since the same blocks are used for both WB and NB transmissions. Furthermore, power consumption is reduced at the power amplifier 630 by setting the first and second operating states in the steps 202 and 204 so as to comply with the quality requirements of the respective first and second signals with minimum power.

Figure 9:
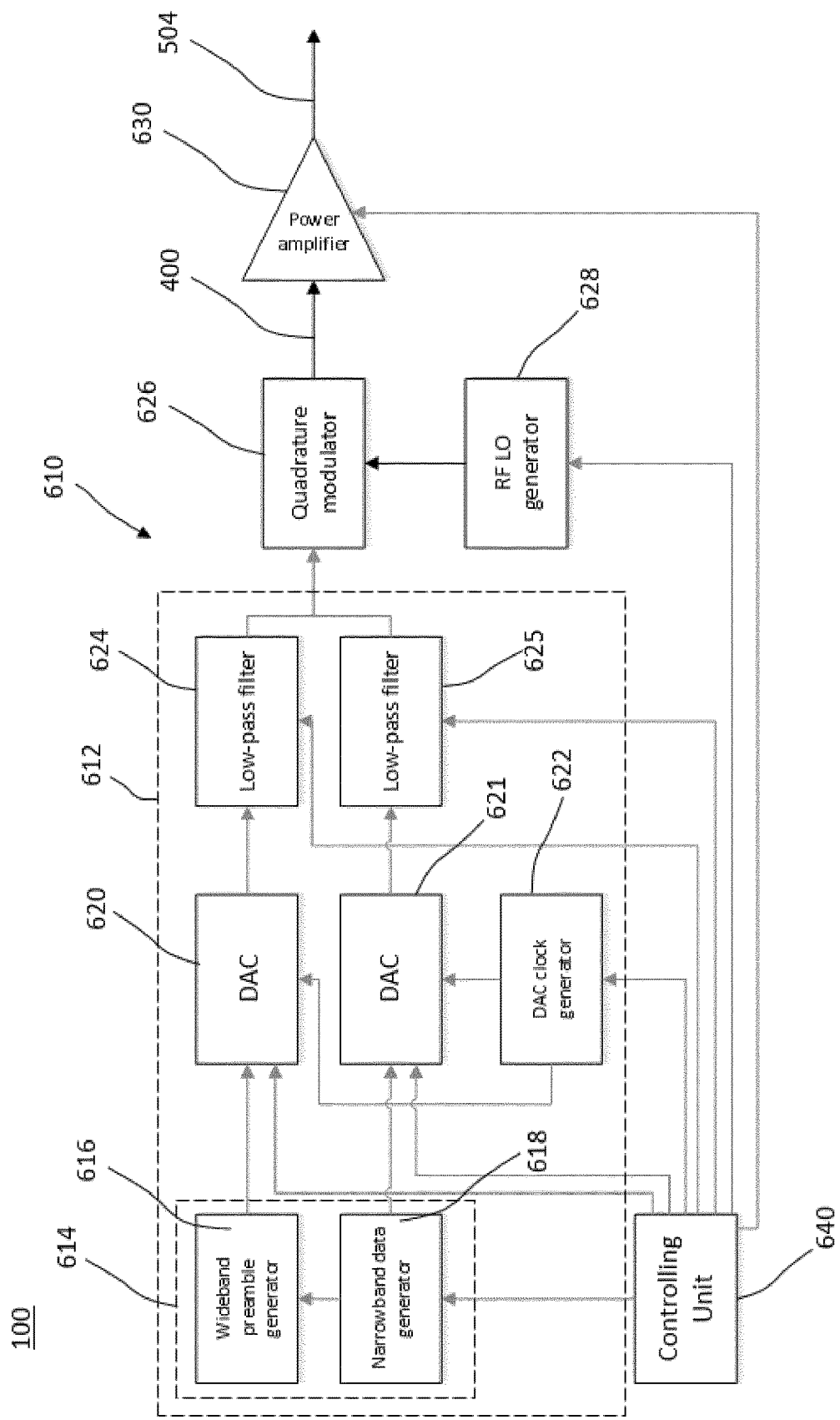
FIG. 9 shows a schematic block diagram for a third embodiment of the device of FIG. 1.

FIG. 9 shows a schematic block diagram for a third implementation of the device 100. Features equivalent or interchangeable with the first or second embodiment are indicated by like reference signs. The third embodiment can be implemented to further reduce the power consumption (e.g., without sacrificing at least some of the above-mentioned advantages of the second embodiment) by switching not only the operating states of the power amplifier 630, but also changing the bandwidth (e.g. in the frequency domain) and/or a sampling rate (e.g., in the time domain) of at least one or all blocks preceding the power amplifier 630 for the NB transmission and the WB transmission, respectively.

The first and second baseband signals indicative of the WB preamble 302 and NB IoT data 304, respectively, are both generated at baseband (i.e., without the frequency translation) and with first and second sampling rates proportional to, or roughly in proportion to, the respective bandwidth. The first and second baseband signals are fed to a first DAC 620 and a second DAC 621, respectively. The DACs 620 and 621 operate at the different first and second sampling rates. Accordingly, the DACs 620 and 621 may also be referred to as WB and NB DACs, respectively.

The resulting first and second analog baseband signals are subjected to first and second reconstruction (e.g., low-pass) filters 624 and 625, respectively. The passband width of the filters 624 and 625 is proportional to, or roughly in proportion to, the first and second bandwidths 406 and 408 of the first and second signals 402 and 404, respectively. Accordingly, the first and second filters 624 and 625 are also referred to as WB filter and NB filter, respectively.

To achieve the correct RU allocation according to the frequency offset 410 or the correct subcarrier allocation according to the first and second subsets, the controlling unit 640 reconfigures the RF of the LO signal that is generated by the RF LO 628 and that drives the modulator 626. In the step 202, the LO signal provides the RF according to the center frequency of the first signal 402 indicative of the preamble 302 of the PDU. In the step 204, the RF of the LO signal is changed by the frequency offset 410, so that the RF of the LO signal in the step 206 corresponds to the center frequency of the second signal 404 indicative of the NB IoT data 304.

The same controlling unit 640 that controls the WB preamble generator 616 and the NB IoT data generators 618 also controls the RF LO 628 for generating and transmitting the WB preamble in the step 202 and the NB IoT data in the step 206. The PLL has a certain settling time after reconfiguring for the changed frequency in the step 204, typically in the range of 100 µs.

Preferably, no radio signal 504 is transmitted during the settling time. For example, the input of the power amplifier 630 is decoupled from the modulator 626 during the settling time. Alternatively or in addition, a supply voltage or supply current of the power amplifier 630 is reduced or set to zero during the settling time. Alternatively or in addition, the output of the power amplifier 630 is decoupled from the transmit antenna 650 during the settling time.

The controlling unit 640 controls the DACs 620 and 621 and the filters 624 and 625 to power up and down in accordance with the WB preamble transmission in the step 202 and the NB IoT data transmission in the step 206.

The controlling unit 640 controls the DAC clock generator 622 to provide the respective clock frequency needed by the WB DAC 620 and the NB DAC 621 in the steps 202 and 206, respectively. The clock frequency may also be referred to as sampling-frequency or baseband-frequency. The controlling unit 640 may also control the operating point of the power amplifier 630 such that the power amplifier 630 operates in a more power-efficient and less linear mode (i.e., the first operating state) during WB preamble transmission in the step 202.

While the transmitter architecture 600 of the third embodiment may appear to be more complex than the transmitter architecture 600 of the second embodiment (e.g., in terms of the number of blocks or units), the third embodiment is not necessarily more costly, e.g. with regards to chip area, since the different signal paths and/or each block of the third embodiment (e.g., within the analog baseband signal generator 612) may be optimized for their associated transmission mode (e.g., being WB and NB and having different linearity requirements). Alternatively or in addition, the third embodiment can even further reduce the power consumption (e.g., as compared to the second embodiment).

Figure 10:
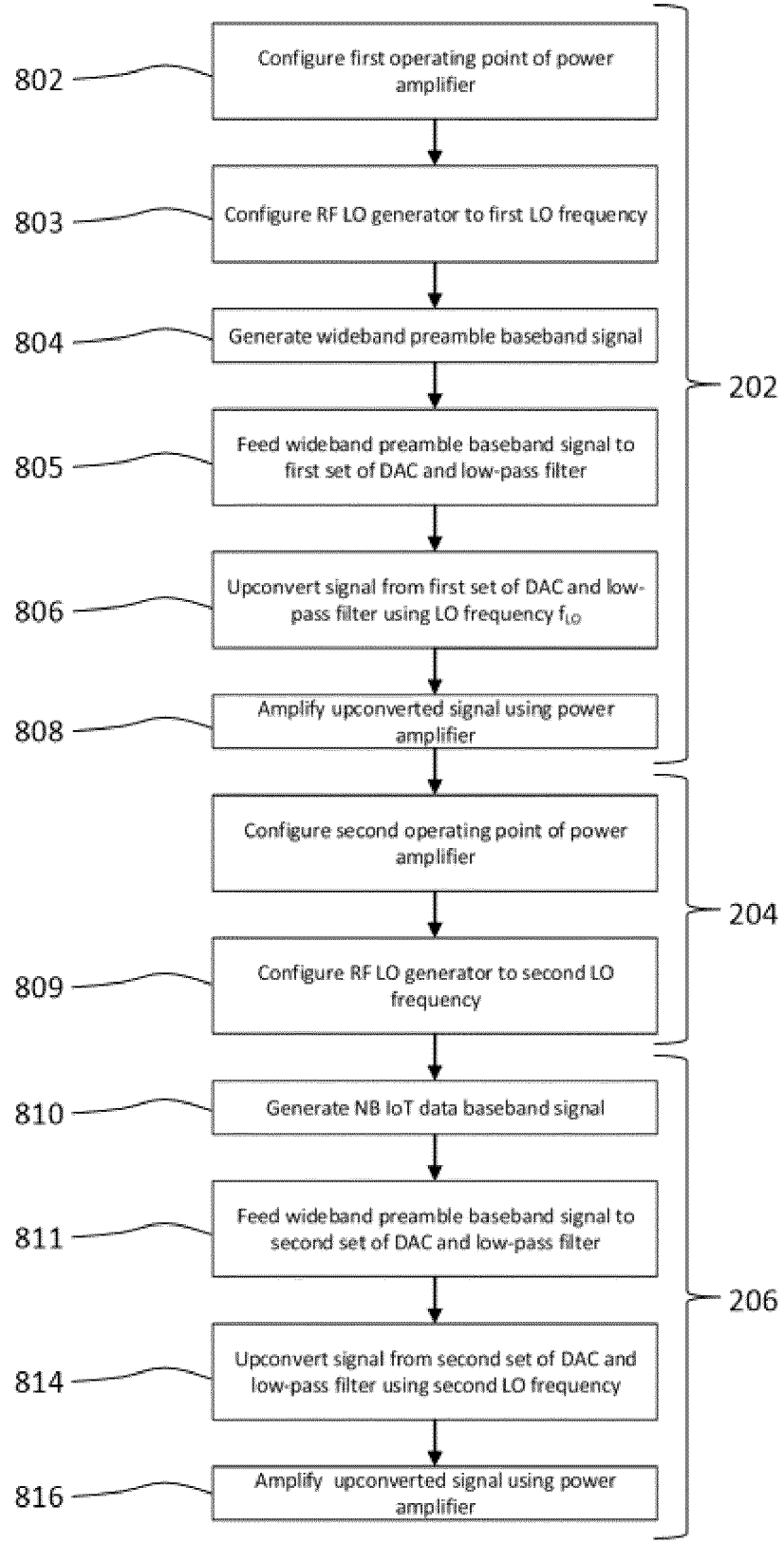
FIG. 10 shows a flowchart for a third implementation of the method of FIG. 2, which can be performed by the device of FIG. 9.

A flowchart for operating the third embodiment according to a third implementation of the method 200 is shown in FIG. 10. Steps and substeps corresponding to those of the second implementation in FIG. 8 are indicated by like reference signs.

In conjunction with setting the first operating state in the substep 802 of the step 202, the RF LO 628 is configured to the RF of the first signal 402. The generated first digital baseband signal indicative of the preamble 302 is fed to the corresponding WB DAC 620 and WB filter 624 in a substep 805 of the step 202. In the substep 806, the LO signal provided by the RF LO 628 configured in the substep 803 is used for the up-conversion.

In addition to setting the second operating state in the step 204, the RF LO 628 is configured to the RF of the second signal 404 in a substep 809.

Preferably, the RF LO 628 is configured and reconfigured in the substeps 803 and 809 prior to generating the first and second analog baseband signals in the substeps 804-805 and 810-811, respectively, so that the settling time of the RF LO 628 has elapsed by the time the LO signal is used.

In any embodiment and implementation, the respective quality requirements for the amplification of the first signal 402 and the second signal 404 by the power amplifier 630 may include an upper limit on distortion. The limit on the distortion may be defined in terms of an Error Vector Magnitude (EVM), an Adjacent Channel Leakage Power Ratio (ACLR) or a Signal-to-Noise and Distortion Ratio (SNDR), e.g., defined for the transmit radio signal 504. The SNDR is the ratio of signal power to the sum of noise power and spurious harmonics power. EVM is a quantity that is directly related to SNDR as the SNDR quantifies the quality of the signal with regards to the information that is to be conveyed to a receiver.

The distortion (e.g., spurious harmonics appearing outside the channel of interest) is caused by a non-linearity of the power amplifier 630 in the respective operating state. The quality requirement may be defined based on the transmit radio signal 504, e.g., in terms of EVM and ACLR (e.g., in a 3GPP implementation). Alternatively or in addition (e.g., in an IEEE 802.11 implementation), a spectrum mask defines maximum allowed emission outside its own channel. The first and second operating states minimize the power consumption of the power amplifier 630 under the condition that a distortion limit (e.g., EVM) predefined for each of the first signal 402 and second signal 404 is fulfilled.

In any embodiment and implementation, the quality (e.g., an inverse EVM) required for the first signal 402 indicative of the WB preamble 302 may be less than the quality (e.g., an inverse EVM) required for the second signal 404 indicative of the NB IoT data 304. Hence, the first operating state is set to be more energy-efficient with less linear range of the power amplifier 630 as compared to the power amplifier 630 in the second operating state.

Alternatively or in addition, the higher clock frequency for the WB DAC 620 (e.g., used in the substep 805) is generated from the lower clock frequency for the NB DAC 621 (e.g., used in the substep 811). The higher clock frequency may be derived from the lower clock frequency using a delay locked loop (DLL), e.g., a DLL-based frequency multiplier.

Figure 11:
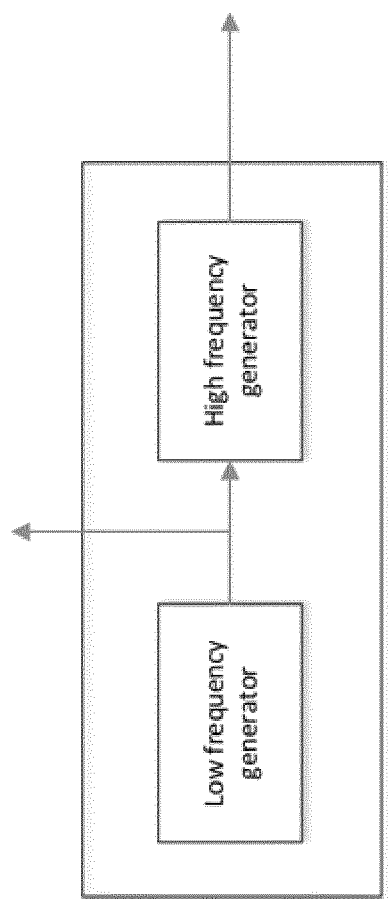
FIG. 11 shows a schematic block diagram for a frequency generator, which is implementable in any embodiment of the device of FIG. 1.

FIG. 11 schematically illustrates an embodiment of the DAC clock generator 622 configured to provide both the lower clock frequency provided to the NB DAC 621 for the second baseband signal and the higher clock frequency provided to the WB DAC 620 for the first baseband signal. The lower DAC clock frequency is used for the NB transmission in the step 206, while the higher clock frequency is used for the WB transmission in the step 202. A naive approach would derive the lower clock frequency from the higher clock frequency which would have to be generated throughout generating the radio signal 504. In contrast, the DAC clock generator 622 natively generates the lower clock frequency corresponding to the second bandwidth 408 and derives the higher clock frequency corresponding to the first bandwidth 410 from the lower clock frequency. As a consequence, the power consumption of the transmitter architecture 600 is further reduces, since generating the lower clock frequency consumes less power than generating the higher clock frequency. Moreover, both the higher clock frequency and the lower clock frequency fulfill their respective quality requirements. For example, the DAC clock generator 622 may be configured to provide the derived higher clock frequency to fulfill a quality requirement on jitter and/or phase noise predefined for the first signal 402 indicative of the WB preamble 302, which is less than a quality requirement on jitter and/or phase noise predefined for the second signal 404 indicative of the NB data 304.

Figure 12:
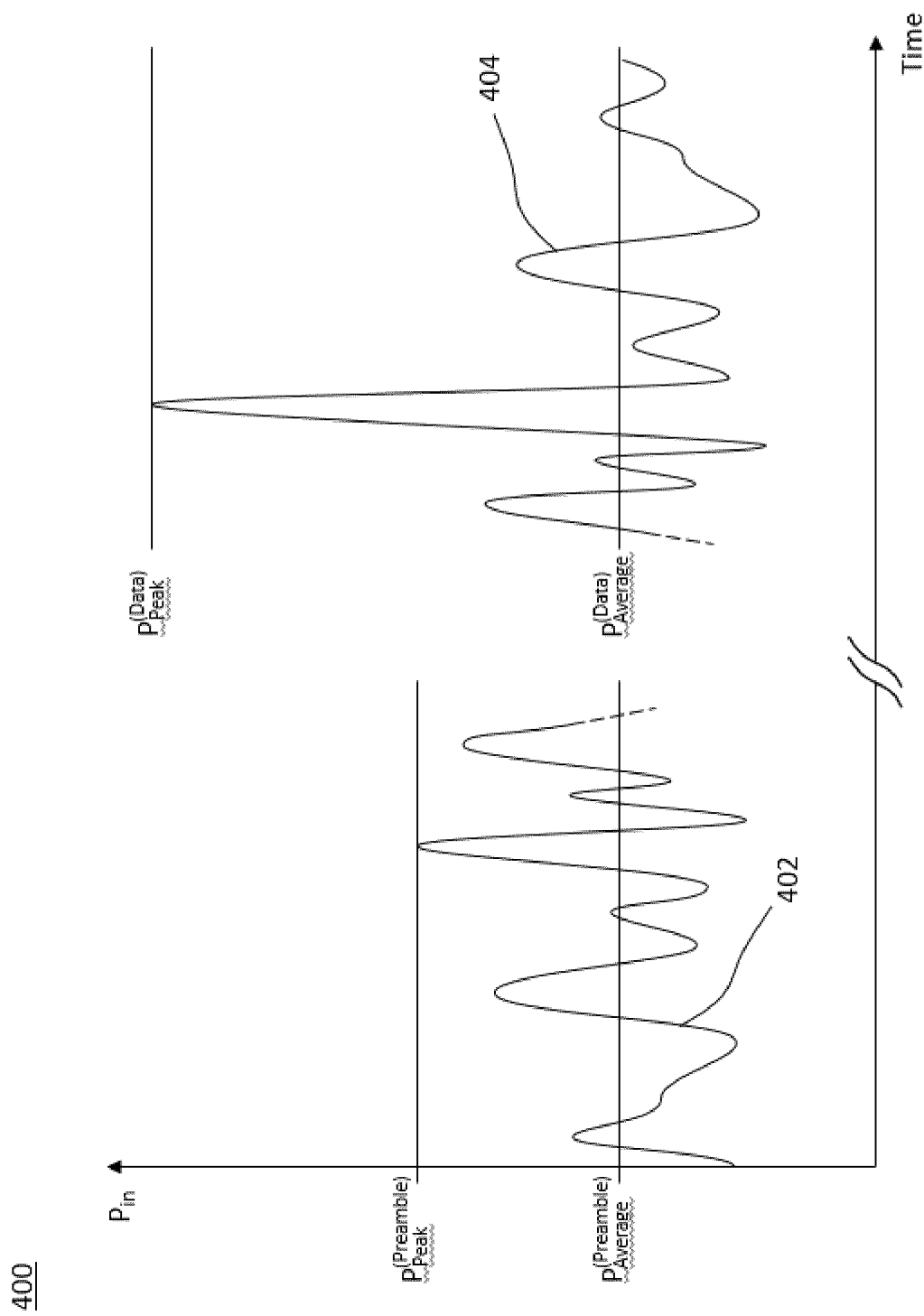
FIG. 12 schematically illustrates an example for an envelope power of a signal indicative of a PDU, which is implementable in any embodiment of the device of FIG. 1 or usable in any implementation of the method of FIG. 2

FIG. 12 schematically illustrates an example for an envelope power of the signal 400 indicative of a PDU 300 at the input of the power amplifier 630. The first signal 402 indicative of the preamble 302 has a peak-to-average power ratio (PAPR) that is less than the PAPR of the second signal 404 indicative of the data 304, e.g. according to $$\frac{P_{Peak}^{(Preamble)}}{P_{Average}^{(Preamble)}} < \frac{P_{Peak}^{(Data)}}{P_{Average}^{(Data)}}.$$

While a constant average power is of the signal 400 is schematically illustrated in FIG. 12, the average power of the preamble 302, $P_{Average}^{(Preamble)}$, and the average power of the data 304, $P_{Average}^{(Data)}$ are not necessarily equal.

For the step 202, the operating state of the power amplifier 630 is set to a first range of linear amplification (e.g., in the substep 802) that is reduced compared to a second range of linear amplification set in the step 204. Thus, power consumption is reduced during the WB transmission in the step 202.

The PAPR of the first signal 402 indicative of the preamble 302 may be less than the PAPR of the second signal 404 indicative of the preamble 304 due to a modulation and/or a coding scheme, e.g., performed by the signal generators 616 and 618.

By way of example, the preamble 302 may be generated according to a standard of the standard family IEEE 802.11, in particular a so-called legacy preamble. The legacy preambles enable the coexistence between NB stations 502 and WB stations 508, e.g., in a radio network 500 according to IEEE 802.11ax.

The lower PAPR of the first signal 402 is a consequence of the standard definition for the preamble 302. The preambles 302 defined by the standards IEEE 802.11a/g/n/ac for OFDM on the physical layer (PHY) of the stations 502 and 508 of the radio network 500 are modulated according to a binary phase-shift keying (BPSK), which is very robust to distortions at the transmitter side, e.g., caused by the power amplifier 630 in the first operating state. In other words, high transmitter error vector magnitude (EVM) is tolerated with very little performance degradation. In fact, the factor that typically limits the EVM is not the degradation of performance (e.g., in terms of an increasing PDU error rate) but rather out-of-band emissions.

The power amplifier 630 is most efficient when driven to saturation in the first operating state. The efficiency of the power amplifier 630 drops rapidly for increased Output Backoff (OBO) or headroom. Below Table exemplifies the degradation of the radio signal 504 (as far as the preamble is transmitted) due to saturation of the power amplifier 630 at a given error rate for decoding the first portion 302 (e.g., the PHY header). The first column indicates the OBO relative to full saturation, and the second column indicates the signal degradation (in dB) of PHY header performance.

| OBO (dB) | Degradation (dB) @ 10% error rate for decoding the header |
| --- | --- |
| 12 | 0.0 |
| 4 | 0.3 |
| 2 | 0.9 |
| 1 | 1.5 |

A low OBO causes a high EVM.

More specifically, above values are computed for the preamble 302 being an IEEE 802.11a/g legacy preamble, the WB channel being an additive white Gaussian noise channel, and the so-called Rapp power amplifier model relating the amplitude $A_{in}$ of the input signal (i.e., the first signal 402) and the amplitude $A_{out}$ of the output signal (i.e., the radio signal 504 as far as is preamble is concerned) according to:

$$A_{out} = \frac{A_{in}}{\left(1 + A_{in}^{2p}\right)^{\frac{1}{2p}}},$$

wherein p=3.

Above results illustrate that, in general, the legacy preambles 302 are very robust and tolerate a substantial non-linear distortion without large performance losses, thus allowing the power amplifier 630 to operate at a higher efficiency in the first operating state, e.g., as compared to the second operating state.

Since the distortion caused by the power amplifier 630 in the first operating state may causes spectral re-growth, there may be a further limit to which extent the power amplifier 630 can be pushed into saturation in the first operating state, as the power amplifier output 504 needs to comply with a specified spectrum mask. Furthermore, higher levels of distortion and noise can also be accepted by blocks preceding the power amplifier 630 in the transmitter architecture 600, for example the DAC 620 that may operate at low resolution.

Using the robustness of the legacy preambles 302, the power consumption of the power amplifier 630 is reduced. FIGS. 13 and 14 schematically illustrate ranges of linear amplification of the power amplifier 630 in the first and second operating states, respectively. In a first variant, the operating point of the power amplifier 630 in the first operating state minimizes the linear range $P_{max}^{(Linear)}$ to correspond to the peak power of the first signal 402. In a second variant, the first operating reduces the linear range $P_{max}^{(Linear)}$ below the peak power of the first signal 402 exploiting the robustness of the first signal 402. Alternatively or in addition, in any variant, the first signal 402 may exercises the region up to saturation (i.e., beyond the linear range $P_{max}^{(Linear)}$), wherein the range up to saturation is more nonlinear (as schematically illustrated in FIG. 13) compared to the second operating state (schematically illustrated in FIG. 14).

FIG. 15 shows a schematic block diagram of an embodiment of the power amplifier 630 for changing the operating state of the power amplifier 630 by controlling at least one of a bias voltage 1502 and a supply voltage 1504 of the power amplifier 630. While the embodiment of the power amplifier 630 shown in FIG. 15 includes a single transistor element for simplicity, the corresponding operating parameters, or further operating parameters, of other embodiments of the power amplifier 630 can be controlled to set the operating states.

For example, the bias voltage 1502 in the first operating state is less than the bias voltage 1502 in the second operating state. Alternatively or in addition, the parameters 1502 and 1504 for controlling the operating state of the power amplifier 630 are controlled by the controlling unit 640 to fulfil a predefined PDU error rate and a predefined quality requirement (e.g., in terms of SNDR and/or EVM) for the amplification of the first signal 402 at minimum power consumption. This results in power saving, because the predefined quality requirement for the amplified first signal 402 is less than the predefined quality requirement for the amplified second signal 404 at a given error rate.

The bias voltage 1502 of the first and second operating states may be set in relation to (e.g., proportional to) the amplitude (e.g., the peak amplitude) of the input signal, i.e., the first signal 402 and second signal 404, respectively. For example, the bias voltage 1502 of the second operating state may be set in relation to (e.g., proportional to) the amplitude of the second signal 404, wherein the amplitude (e.g., the peak amplitude) of the second signal 404 is less or comparable to the bias voltage 1502. The gain of the power amplifier may be roughly constant over the trajectory of the second signal 404. With the smaller bias voltage 1502 set for the first operating state, the gain of the amplifier 630 changes over the trajectory of the first signal 402, e.g. at peaks of the first signal 402 the gain will be higher compared to at dips of the first signal 402. The gain expansion at the peaks may be larger than the gain reduction at dips such that an average gain increases with increasing input signal amplitude.

In any embodiment or implementation, the PDU 300 or a sequence of PDUs 300 may include a wake-up signal (WUS). For example, the radio network 500 may comprise wake-up receivers (WUR) configured to receive the PDU 300 or a PDU 300 transmitted subsequently to the WUS. By way of example, the WUS is implemented in the second portion 302 of the PDU 300, e.g., employing On-Off Keying (OOK), after the first portion 302 starting the PDU 300 with a WB legacy preamble, thus facilitating the coexistence with legacy IEEE 802.11 stations. Moreover, the WUR may be implemented in an access point (AP) of the radio network 500, e.g. a UE (such as a smartphone) or any other battery-powered station, which can benefit from extended sleep periods terminated by the WUS. For example, a NB IoT station 502 may transmit a WUS to the AP according to the method 200.

Figure 16:
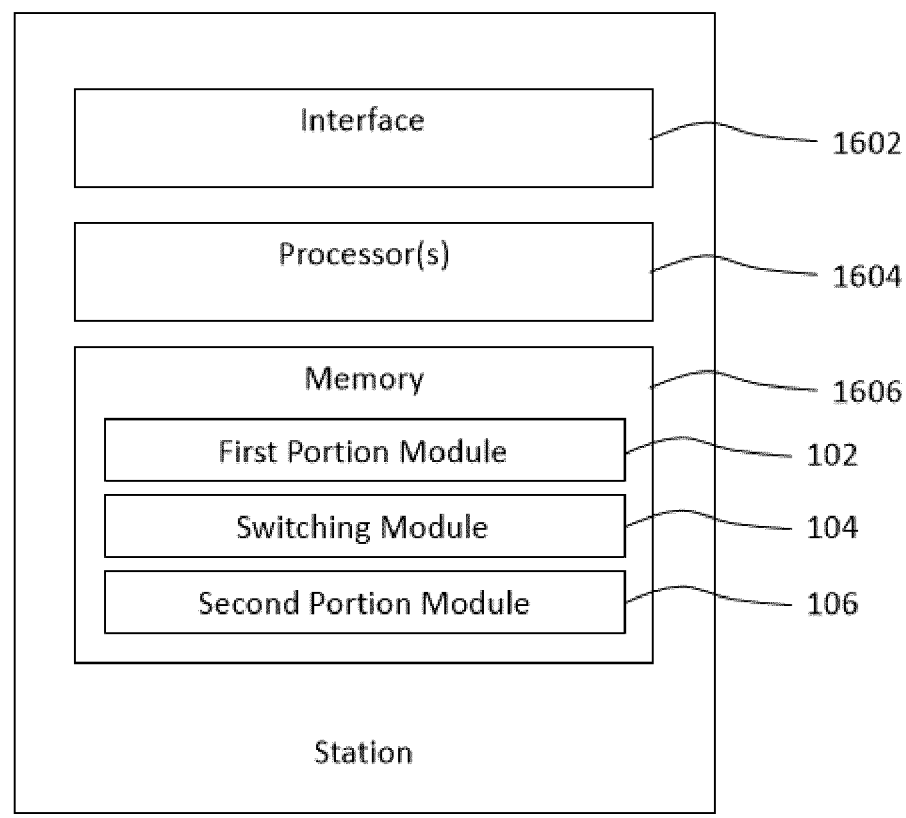
FIG. 16 shows a schematic block diagram of an embodiment of a station for performing the method of FIG. 2.

FIG. 16 shows a schematic block diagram for an embodiment of a station, e.g., the NB station 502. The station 502 comprises a radio interface 502 for radio communication within a radio network, e.g., the radio network 500, one or more processor circuits 1604 for performing the method 200 and memory 1606 coupled to the processor circuits 1604. The memory 1606 is encoded with instructions that implement the modules 102, 104 and 106.

The one or more processor circuits 1604 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other station components, such as the memory 1606, station functionality. For example, the one or more processor circuits 1604 may execute instructions stored in the memory 1606. Such functionality may include providing various features and steps discussed herein, including any of the benefits disclosed herein.

As has become apparent from above description of exemplary embodiments, NB stations can transmit preambles or any PDU portion for coexistence in a WB radio network, e.g., for bandwidth protection. Using the technique, the hidden-node problem can be alleviated. Conventionally, an IoT station would have required a WB transceiver for transmitting such preambles, which has a negative impact on power consumption and cost of the conventional IoT station, or the alternative of relaxing the requirements on NB IoT stations and allowing them to skip the transmission of legacy preambles aggravates the hidden-node problem. The technique enables energy-efficient NB station that comply with the protection mechanism.

The technique can be embodied for low-cost and low-power IoT devices. Compared to the state of the art, a better compromise between bandwidth protection on the one hand and low cost and/or power efficiency on the other can be achieved.

The generation of NB signals protected by WB legacy preambles according to the technique can be applied for transmitting wake-up signals for triggering wake-up receivers, e.g., an access point.

The technique can enable the coexistence of IoT devices with WB radio network, including cellular radio access technologies (e.g., defined by 3GPP) operating in unlicensed bands. The technique is advantageous for designing low-end, high-volume and/or power-efficient IoT stations with narrow RX and TX bandwidths, since power consumption increases with the bandwidth. For example, the energy consumption of digital to analog converters increases as the sampling rate increases. Thus, the technique enables many IoT devices, e.g., operating IEEE 802.11 radio networks, using bandwidths in the order of 2 MHz for data transmission, while being compatible with wideband or broadband devices using bandwidths of 20 MHz or more.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of generating a radio signal for transmitting a protocol data unit (PDU) in a radio network, wherein the PDU includes a first portion and a second portion, the method comprising:
    amplifying a first signal indicative of the first portion of the PDU for radio transmission using a power amplifier in a first operating state, wherein the amplifying the first signal includes generating a wideband preamble baseband signal indicative of the first portion on a first set of orthogonal frequency-division multiplexing (OFDM) subcarriers;
    switching the power amplifier from the first operating state to a second operating state different from the first operating state; and
    amplifying a second signal indicative of the second portion of the PDU for radio transmission using the power amplifier in the second operating state, wherein the amplifying the second signal includes generating a narrowband baseband signal indicative of the second portion on a second set of OFDM subcarriers, and wherein a first bandwidth of the first signal is greater than a second bandwidth of the second signal.

2. The method of claim 1, wherein the radio signal includes, in the time domain, the amplified first portion of the PDU followed by the amplified second portion of the PDU.

3. The method of claim 1, wherein the first portion of the PDU includes a preamble of the PDU and/or a header of the PDU.

4. The method of claim 1, wherein the second portion of the PDU includes a Service Data Unit (SDU) of the PDU and/or payload data of the PDU.

5. The method of claim 1, further comprising:
    generating the first signal by performing a first scheme for coding and/or modulation of the first portion; and
    generating the second signal by performing a second scheme for coding and/or modulation of the second portion.

6. The method of claim 1, wherein a peak-to-average power ratio (PAPR) of the first signal is lower than a PAPR of the second signal.

7. The method of claim 1, wherein:
the first portion of the PDU is transmitted on the first set of OFDM subcarriers; and
the second portion of the PDU is transmitted on the second set of OFDM subcarriers.

8. The method of claim 1, wherein:
the amplifying the first signal further includes controlling a baseband signal generator to generate the wideband preamble baseband signal indicative of the first portion and controlling the power amplifier to operate in the first operating state; and
the switching or the amplifying the second signal includes controlling the baseband signal generator to generate the narrowband baseband signal indicative of the second portion and controlling the power amplifier to operate in the second operating state.

9. The method of claim 8, further comprising performing an up-conversion of the wideband preamble and narrowband baseband signals to the first and second signals, respectively, that are input to the power amplifier.

10. The method of claim 9, wherein the wideband preamble and narrowband baseband signals are up-converted according to first and second carrier frequencies, respectively, and wherein the first carrier frequency is different from the second carrier frequency.

11. The method of claim 10, wherein:
the first portion of the PDU is transmitted on the first set of OFDM subcarriers;
the second portion of the PDU is transmitted on the second set of OFDM subcarriers;
the first carrier frequency is a center frequency of the first set of the OFDM subcarriers; and
the second carrier frequency is a center frequency of the second set of the OFDM subcarriers.

12. The method of claim 8, wherein:
the first portion of the PDU is transmitted on the first set of OFDM subcarriers;
the second portion of the PDU is transmitted on the second set of OFDM subcarriers; and
the narrowband baseband signal is frequency-shifted according to the second set of OFDM subcarriers within the first set of OFDM subcarriers.

13. The method of claim 12, further comprising performing an up-conversion of the wideband preamble and narrowband baseband signals to the first and second signals, respectively, that are input to the power amplifier, wherein the wideband preamble and narrowband baseband signals are up-converted according to the same carrier frequency.

14. The method of claim 8, wherein the generating the wideband preamble and narrowband baseband signals includes an inverse Fourier transformation and/or a digital-to-analog conversion according to first and second sampling frequencies defining the first and second bandwidths, respectively.

15. The method of claim 1, wherein the switching the power amplifier from the first operating state to the second operating state includes changing a bias voltage, a bias current, a supply voltage, and/or a supply current of the power amplifier.

16. The method of claim 1, wherein the switching the power amplifier from the first operating state to the second operating state includes increasing a bias voltage, a bias current, a supply voltage, and/or a supply current of the power amplifier.

17. The method of claim 1, wherein:
amplification of the power amplifier in the second operating state is more linear than the amplification of the power amplifier in the first operating state; or
amplification of the power amplifier in the first operating state is more energy-efficient than the amplification of the power amplifier in the second operating state.

18. The method of claim 1, wherein a second linear dynamic range of the power amplifier in the second operating state is greater than a first linear dynamic range of the power amplifier in the first operating state.

19. A device for generating a radio signal for transmitting a protocol data unit (PDU) in a radio network, wherein the PDU includes a first portion and a second portion, the device comprising:
processing circuitry; and
memory containing instructions executable by the processing circuitry whereby the device is operative to:
amplify a first signal indicative of the first portion of the PDU for radio transmission using a power amplifier in a first operating state, wherein, to amplify the first signal, the device is operative to generate a wideband preamble baseband signal indicative of the first portion on a first set of orthogonal frequency-division multiplexing (OFDM) subcarriers;
switch the power amplifier from the first operating state to a second operating state different from the first operating state; and
amplify a second signal indicative of the second portion of the PDU for radio transmission using the power amplifier in the second operating state, wherein, to amplify the second signal, the device is operative to generate a narrowband baseband signal indicative of the second portion on a second set of OFDM subcarriers, and wherein a first bandwidth of the first signal is greater than a second bandwidth of the second signal.

20. A transmitter structure configured for transmitting a protocol data unit (PDU) in a radio network, wherein the PDU includes a first portion and a second portion, the transmitter structure comprising:
a device for generating a radio signal for transmitting the PDU in the radio network, the device comprising:
processing circuitry; and
memory containing instructions executable by the processing circuitry whereby the device is operative to:
amplify a first signal indicative of the first portion of the PDU for radio transmission using a power amplifier in a first operating state, wherein, to amplify the first signal, the device is operative to generate a wideband preamble baseband signal indicative of the first portion on a first set of orthogonal frequency-division multiplexing (OFDM) subcarriers;
switch the power amplifier from the first operating state to a second operating state different from the first operating state; and
amplify a second signal indicative of the second portion of the PDU for radio transmission using the power amplifier in the second operating state, wherein, to amplify the second signal, the device is operative to generate a narrowband baseband signal indicative of the second portion on a second set of OFDM subcarriers, and wherein a first bandwidth of the first signal is greater than a second bandwidth of the second signal.

* * * * *